US010856326B2

(12) United States Patent
Ma et al.

(10) Patent No.: US 10,856,326 B2
(45) Date of Patent: Dec. 1, 2020

(54) CHANNEL ACCESS IN BSS PCP/AP CLUSTER SERVICE SET

(71) Applicants: Mengyao Ma, Guangdong (CN); Sheng Sun, Ottawa (CA); Yan Xin, Ottawa (CA); Kwok Shum Au, Ottawa (CA)

(72) Inventors: Mengyao Ma, Guangdong (CN); Sheng Sun, Ottawa (CA); Yan Xin, Ottawa (CA); Kwok Shum Au, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 97 days.

(21) Appl. No.: 15/894,481

(22) Filed: Feb. 12, 2018

(65) Prior Publication Data

US 2019/0254066 A1 Aug. 15, 2019

(51) Int. Cl.
*H04W 76/00* (2018.01)
*H04W 74/00* (2009.01)
*H04W 76/10* (2018.01)
*H04W 88/12* (2009.01)
*H04W 84/12* (2009.01)
*H04W 48/08* (2009.01)

(52) U.S. Cl.
CPC ......... *H04W 74/006* (2013.01); *H04W 76/10* (2018.02); *H04W 48/08* (2013.01); *H04W 84/12* (2013.01); *H04W 88/12* (2013.01)

(58) Field of Classification Search
CPC ...... H04W 76/00; H04W 88/08; H04W 72/04
See application file for complete search history.

(56) References Cited

U.S. PATENT DOCUMENTS

| 9,918,343 | B2 * | 3/2018 | Son | H04W 72/082 |
|---|---|---|---|---|
| 2010/0214169 | A1 * | 8/2010 | Kafle | H01Q 3/26 |
| | | | | 342/368 |
| 2010/0317388 | A1 * | 12/2010 | Chu | H04L 5/0037 |
| | | | | 455/509 |
| 2011/0134852 | A1 * | 6/2011 | Cordeiro | H04W 8/18 |
| | | | | 370/329 |

(Continued)

FOREIGN PATENT DOCUMENTS

| CN | 103118406 A | 5/2013 |
|---|---|---|
| CN | 103491632 A | 1/2014 |

(Continued)

OTHER PUBLICATIONS

Sun, Sheng et al., U.S. Appl. No. 62/484,112, "BSS PCP/AP Cluster Network Reference Architecture", filed Apr. 11, 2017.
IEEE Standards Association, 802.11ad-2012, pp. 247 to 267.

*Primary Examiner* — Michael J Moore, Jr.
*Assistant Examiner* — Prenell P Jones

(57) ABSTRACT

Methods and systems for channel access in a BSS having two or more PCP/APs. A C-PCP/AP transmits at least a first management/extension frame, the management/extension frame including information for channel access by a STA. The C-PCP/AP receives, from the STA, at least a second management/extension frame. Based on information exchanged between the C-PCP/AP and the STA via at least the first and second management/extension frames, the STA is provided with channel access within the BSS by: the C-PCP/AP establishing a communication link for the C-PCP/AP to serve the STA; or the C-PCP/AP assigning a second PCP/AP in the BSS to serve the STA.

23 Claims, 13 Drawing Sheets

(56) References Cited

U.S. PATENT DOCUMENTS

| | | | |
|---|---|---|---|
| 2011/0149842 A1* | 6/2011 | Cordeiro | H04B 7/0491 370/328 |
| 2014/0169288 A1* | 6/2014 | Cordeiro | H04W 8/18 370/329 |
| 2015/0245275 A1* | 8/2015 | Naka | H04W 40/244 370/310 |
| 2015/0359008 A1* | 12/2015 | Wang | H04W 74/004 370/330 |
| 2016/0007234 A1 | 1/2016 | Li et al. | |
| 2016/0088558 A1* | 3/2016 | Chu | H04L 61/6022 370/311 |
| 2016/0119043 A1* | 4/2016 | Rajagopal | H04B 7/063 370/329 |
| 2016/0255573 A1* | 9/2016 | Son | H04W 48/16 370/328 |
| 2016/0381525 A1* | 12/2016 | Trainin | H04L 61/6022 455/519 |
| 2017/0280354 A1* | 9/2017 | Huang | H04B 1/707 |
| 2017/0318621 A1* | 11/2017 | Irie | H04W 16/14 |
| 2017/0339732 A1* | 11/2017 | Matsuyama | H04W 12/0401 |
| 2018/0026752 A1* | 1/2018 | Andonieh | H04L 1/1614 370/338 |
| 2018/0242373 A1* | 8/2018 | Wang | H04W 74/004 |
| 2018/0270863 A1* | 9/2018 | Oteri | H04W 74/0816 |
| 2018/0294933 A1* | 10/2018 | Sun | H04W 56/001 |
| 2019/0045520 A1* | 2/2019 | Venkatachalam Jayaraman | H04L 5/1469 |
| 2019/0058511 A1* | 2/2019 | Bolotin | H04B 7/0452 |
| 2019/0075510 A1 | 3/2019 | Li | |
| 2019/0090162 A1* | 3/2019 | Roy | H04W 36/0005 |
| 2019/0140776 A1* | 5/2019 | Seo | H04L 1/0071 |
| 2019/0208463 A1* | 7/2019 | Lou | H04W 48/12 |
| 2019/0327788 A1* | 10/2019 | Irie | H04L 5/0073 |

FOREIGN PATENT DOCUMENTS

| | | |
|---|---|---|
| CN | 105917704 A | 8/2016 |
| WO | 2016160727 A1 | 10/2016 |

* cited by examiner

CHANNEL ACCESS IN BSS PCP/AP CLUSTER SERVICE SET

FIELD

The present disclosure relates to methods and apparatuses for channel access in BSS PCP/AP clusters (BPACs), including coordination of channel access with legacy devices.

BACKGROUND

In wireless communications, a personal basic service set (PBSS) control point (PCP) or access point (AP) (generally referred to as a PCP/AP) typically serves to manage communications between the PCP/AP and stations (STAs), and communications among STAs in the network. Each STA may associate with a PCP/AP to associate with the network and gain access to network resources.

According to the IEEE 802.11ad standard (commonly referred to as 802.11ad), clustering of PCP/APs may be used to improve spatial sharing and/or interference mitigation with other co-channel directional multi-gigabit (DMG) basic service sets (BSSs). Typically a synchronization PCP/AP (S-PCP/AP) provides synchronization and other services to a PCP/AP cluster. 802.11ad provides one-to-one communication links. The next generation IEEE 802.11ay standard (commonly referred to as 802.11ay) introduces downlink (DL) multi-user multiple-input multiple-output (MU-MIMO) communications, enabling one PCP/AP to have communication links with multiple STAs simultaneously.

With an increase in dense deployment and an increase in demand of data rates per STA, it is desirable to increase the total capacity of a BSS. Further, it is desirable for any future or next generation technology (e.g., any technology based on any standard beyond IEEE 802.11ay) to co-exist with and to be backwards-compatible with legacy devices (e.g., based on IEEE 802.11ad and/or IEEE 802.11ay standards).

SUMMARY

Examples described herein provide a mechanism for coordinating channel access between next generation devices and legacy devices within a BPAC. Also described is an example next generation beacon interval, and beamforming operations that may be performed during the next generation beacon interval.

In some aspects, the present disclosure describes a method including transmitting, by a coordination personal basic service set control point/access point (PCP/AP) in a basic service set (BSS) having two or more PCPs/APs, at least a first management/extension frame, the management/extension frame including information for channel access by a station (STA) within the BSS. The method also includes receiving, from the STA, at least a second management/extension frame. The method also includes, based on information exchanged between the coordination PCP/AP (C-PCP/AP) and the STA via at least the first and second management/extension frames, providing the STA with channel access within the BSS by: establishing a communication link for the C-PCP/AP to serve the STA; or assigning, by the C-PCP/AP, a second PCP/AP in the BSS to serve the STA.

In any of the preceding aspects/embodiments, transmission of at least the first management/extension frame by the C-PCP/AP may be performed in parallel with transmission of at least a third management/extension frame by at least the second PCP/AP.

In any of the preceding aspects/embodiments, transmission of at least the first management/extension frame by the C-PCP/AP may be performed in sequence with transmission of at least a third management/extension frame by at least the second PCP/AP.

In any of the preceding aspects/embodiments, at least one management/extension frame exchanged between the STA and the C-PCP/AP or the second PCP/AP may include at least one of: synchronization information, BSS identification, STA identification, beamforming information or scheduling information.

In any of the preceding aspects/embodiments, the scheduling information may define a beacon interval (BI) schedule, including a beacon header interval (BHI) and a data transfer interval (DTI).

In any of the preceding aspects/embodiments, a first BI schedule, including a first BHI and a first DTI, may be implemented by the C-PCP/AP and the C-PCP/AP may transmit scheduling information defining a second BI schedule, including a second BHI and a second DTI, to be implemented by the second PCP/AP when serving the STA. The first BI schedule may include a first reserved service period (SP) reserved for transmission of legacy management/extension frames. The second BI schedule may include a second reserved SP reserved for transmission of non-legacy management/extension frames.

In any of the preceding aspects/embodiments, in the first BI schedule, the first reserved SP may be scheduled during the first DTI and data transfer to and from the C-PCP/AP may be permitted in at least one first data transfer portion of the DTI outside of the first reserved SP. In the second BI schedule, the second reserved SP may be scheduled during the second DTI and data transfer to and from the second PCP/AP may be permitted in at least one second data transfer portion of the DTI outside of the second reserved SP.

In any of the preceding aspects/embodiments, the C-PCP/AP, based on information exchanged via at least the first and second management/extension frames, may identify the STA as a legacy STA, and the C-PCP/AP may assign the second PCP/AP to serve the STA in a legacy mode of operation.

In any of the preceding aspects/embodiments, the method may also include exchanging, with the second PCP/AP, information based on management/extension frames exchanged between the STA and the C-PCP/AP. The information exchanged with the second PCP/AP may include information for the C-PCP/AP or the second PCP/AP to establish a communication link to serve the STA.

In some aspects, the present disclosure describes a coordination personal basic service set control point/access point (PCP/AP). The coordination PCP/AP (C-PCP/AP) includes a network interface configured for wireless communication with a station (STA) and at least a second PCP/AP within a basic service set (BSS) having two or more PCPs/APs. The C-PCP/AP also includes a processor coupled to the network interface. The processor is configured to execute instructions to cause the C-PCP/AP to transmit at least a first management/extension frame, the management/extension frame including information for channel access by the STA within the BSS. The processor is also configured to execute instructions to cause the C-PCP/AP to receive, from the STA, at least a second management/extension frame. The processor is also configured to execute instructions to cause the C-PCP/AP to, based on information exchanged between with the STA via at least the first and second management/extension frames, provide the STA with channel access within the BSS by: establishing a communication link to serve the STA; or assigning the second PCP/AP to serve the STA.

In any of the preceding aspects/embodiments, transmission of at least the first management/extension frame may be performed in parallel with transmission of at least a third management/extension frame by at least the second PCP/AP.

In any of the preceding aspects/embodiments, transmission of at least the first management/extension frame may be performed in sequence with transmission of at least a third management/extension frame by at least the second PCP/AP.

In any of the preceding aspects/embodiments, at least one management/extension frame exchanged with the STA may include at least one of: synchronization information, BSS identification, STA identification, beamforming information or scheduling information.

In any of the preceding aspects/embodiments, the scheduling information may define a beacon interval (BI) schedule, including a beacon header interval (BHI) and a data transfer interval (DTI).

In any of the preceding aspects/embodiments, the processor may be further configured to execute instructions to cause the C-PCP/AP to: implement a first BI schedule, including a first BHI and a first DTI; and transmit scheduling information defining a second BI schedule, including a second BHI and a second DTI, to be implemented by the second PCP/AP when serving the STA. The first BI schedule may include a first reserved service period (SP) reserved for transmission of legacy management/extension frames. The second BI schedule may include a second reserved SP reserved for transmission of non-legacy management/extension frames.

In any of the preceding aspects/embodiments, in the first BI schedule, the first reserved SP may be scheduled during the first DTI and data transfer to and from the C-PCP/AP may be permitted in at least one first data transfer portion of the DTI outside of the first reserved SP. In the second BI schedule, the second reserved SP may be scheduled during the second DTI and data transfer to and from the second PCP/AP may be permitted in at least one second data transfer portion of the DTI outside of the second reserved SP.

In any of the preceding aspects/embodiments, the processor may be further configured to execute instructions to cause the C-PCP/AP to, based on information exchanged via at least the first and second management/extension frames, identify the STA as a legacy STA; and assign the second PCP/AP to serve the STA in a legacy mode of operation.

In any of the preceding aspects/embodiments, the processor may be further configured to execute instructions to cause the C-PCP/AP to: exchange, with the second PCP/AP, information based on management/extension frames exchanged with the STA. The information exchanged with the second PCP/AP may include information for establishing a communication link to serve the STA.

In some aspects, the present disclosure describes a method including in a basic service set (BSS) having at least a coordination personal basic service set control point/access point (PCP/AP) and a second PCP/AP, transmitting, by the second PCP/AP, at least a first management/extension frame, the management/extension frame including information for channel access by a station (STA) within the BSS. The method also includes receiving, from the STA, at least a second management/extension frame. The method also includes exchanging information with the coordination PCP/AP (C-PCP/AP), the exchanged information at least partially being based on information contained in the second management/extension frame from the STA.

In any of the preceding aspects/embodiments, the method may also include, in response to instructions received from the C-PCP/AP, establishing a communication link for the second PCP/AP to serve to STA.

In any of the preceding aspects/embodiments, in response to instructions received from the C-PCP/AP, the second PCP/AP may serve the STA in a legacy mode of operation.

In any of the preceding aspects/embodiments, the second PCP/AP may transmit at least the first management/extension frame in response to instructions received from the C-PCP/AP.

In some aspects, the present disclosure describes a personal basic service set control point/access point (PCP/AP) including a network interface configured for wireless communication with a station (STA) and at least a coordination PCP/AP (C-PCP/AP) within a basic service set (BSS) having two or more PCPs/APs. The PCP/AP also includes a processor coupled to the network interface. The processor is configured to execute instructions to cause the PCP/AP to transmit at least a first management/extension frame, the management/extension frame including information for channel access by the STA within the BSS. The processor is also configured to execute instructions to cause the PCP/AP to receive, from the STA, at least a second management/extension frame. The processor is also configured to execute instructions to cause the PCP/AP to exchange information with the C-PCP/AP, the exchanged information at least partially being based on information contained in the second management/extension frame from the STA.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1A:
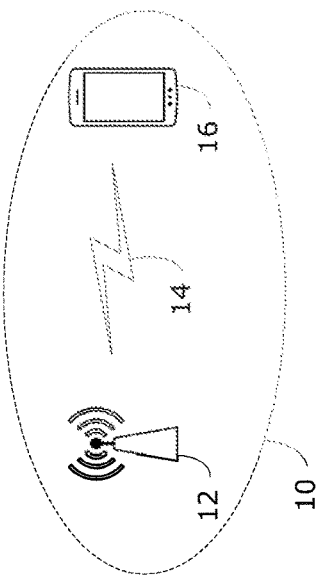
FIG. 1A illustrates an example of a one-to-one communication link in accordance with the IEEE 802.11ad standard.

IEEE 802.11ad (commonly referred to as 802.11ad, and also referred to as directional multi-gigabit (DMG)) is a Wi-Fi standard for operations in the unlicensed 60 GHz spectrum. 802.11ad provides one-to-one communications. FIG. 1A illustrates an example in which a personal basic service set (PBSS) control point (PCP) or access point (AP) 12 has a single communication link 14 with a single station (STA) 16, within one basic service set (BSS) 10.

It should be noted that, in the present disclosure, the terms PCP and AP may be used interchangeably, and generally the term PCP/AP may be used to refer generally to either a PCP or an AP. The PCP/AP may also be referred to as a base station. The PCP/AP may be implemented as a router, for example. The STAs may also be referred to as terminals, user devices, user equipment (UE) or clients, for example. Each STA may be any suitable electronic device (ED), including any device capable of wireless communication, for example mobile or stationary devices such as smartphones, laptops, mobile phones or tablet devices, for example, and the STAs need not be the same as each other.

Figure 1B:
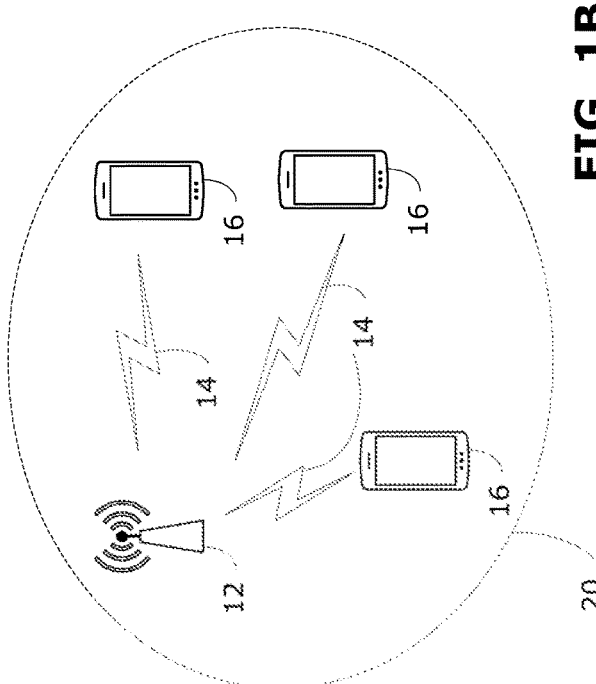
FIG. 1B illustrates an example of one-to-multiple communication links in accordance with the IEEE 802.11ay standard.

IEEE 802.11ay (commonly referred to as 802.11ay, and also referred to as enhanced DMG (EDMG)), is the next generation after IEEE 802.11ad. A feature of 802.11ay is downlink multi-user multiple-input multiple-output (DL MU-MIMO). FIG. 1B illustrates an example of one-to-multiple communications, in accordance with 802.11ay. Using DL MU-MIMO, one PCP/AP 12 can have communication links 14 with multiple STAs 16 simultaneously, within one BSS 20.

Devices operating in 802.11ad or 802.11ay, including PCP/APs 12 and STAs 16, are capable of directional radio signal transmission, using directional antennas, meaning that a transmission beam can steer to a particular transmit sector. Directivity of radio signal transmission provides opportunities for spatial sharing. In spatial sharing, one transmission causes little or no interference to another transmission, when the transmission beams can be spatially separated.

Figure 1C:
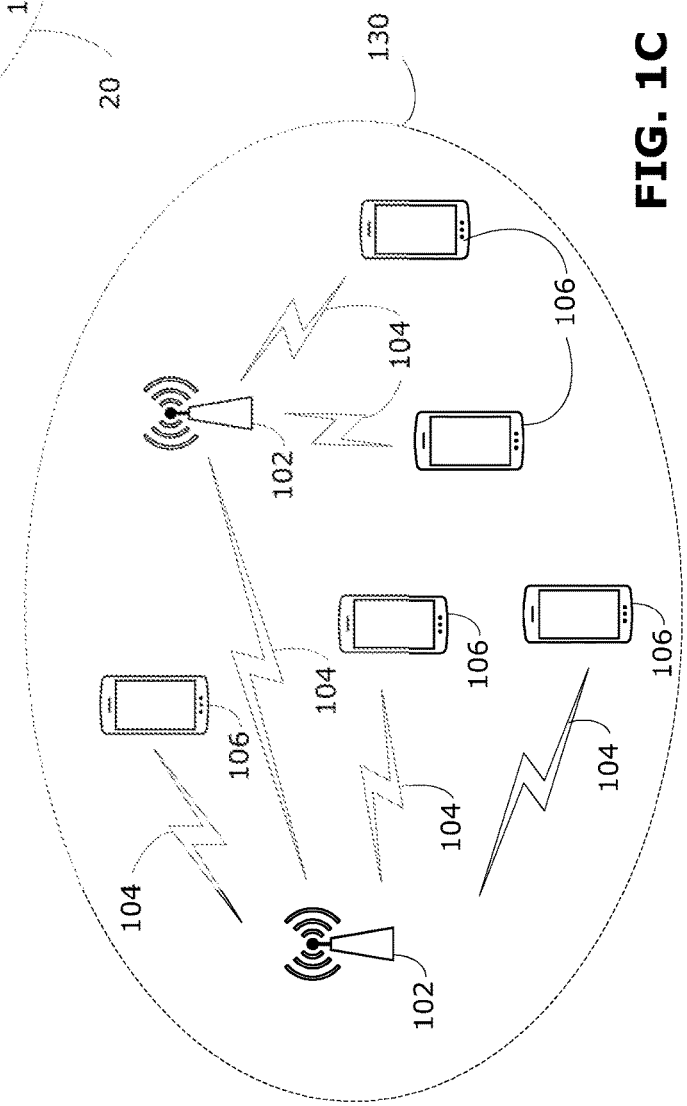
FIG. 1C illustrates an example of multiple-to-multiple communication links in accordance with next generation communications, also referred to as future directional multi-gigabit (FDMG) communications.

A future generation 60 GHz Wi-Fi (FG60) technology is being developed to further exploit the spatial sharing capability. An FG60 system may implement a BSS PCP/AP cluster (BPAC), in which multiple PCP/APs serve multiple STAs in one BPAC BSS. In contrast, a legacy BSS 10, 20 supports only a single PCP/AP within a single BSS. The BPAC BSS reference architecture is further described in U.S. provisional patent application No. 62/484,112, entitled "BSS PCP/AP CLUSTER NETWORK REFERENCE ARCHITECTURE", filed Apr. 11, 2017; and U.S. provisional patent application No. 62/484,135, entitled "SYNCHRONIZED BSS PCP/AP CLUSTER SERVICE SET", filed Apr. 11, 2017, the entireties of which are hereby incorporated by reference. FIG. 1C illustrates an example in which a single BPAC BSS 130 includes multiple PCP/APs 102 (in this example, two PCP/APs 102). Each PCP/AP 102 has communication links 104 with one or more STAs 106 simultaneously, and may also have communication links 104 with one or more other PCP/APs 102. Thus, FG60 may increase capacity of a BSS by enabling multiple-to-multiple communications. Directional communications performed under the FG60 technology may also be referred to as future directional multi-gigabit (FDMG).

The present disclosure describes methods and systems for channel access, in which FDMG-capable devices (also referred to as FDMG devices, FG60 devices, BPAC devices or next generation devices) can co-exist with and be backwards-compatible with legacy devices (e.g., 802.11ad and/or 802.11ay devices).

Figure 2:
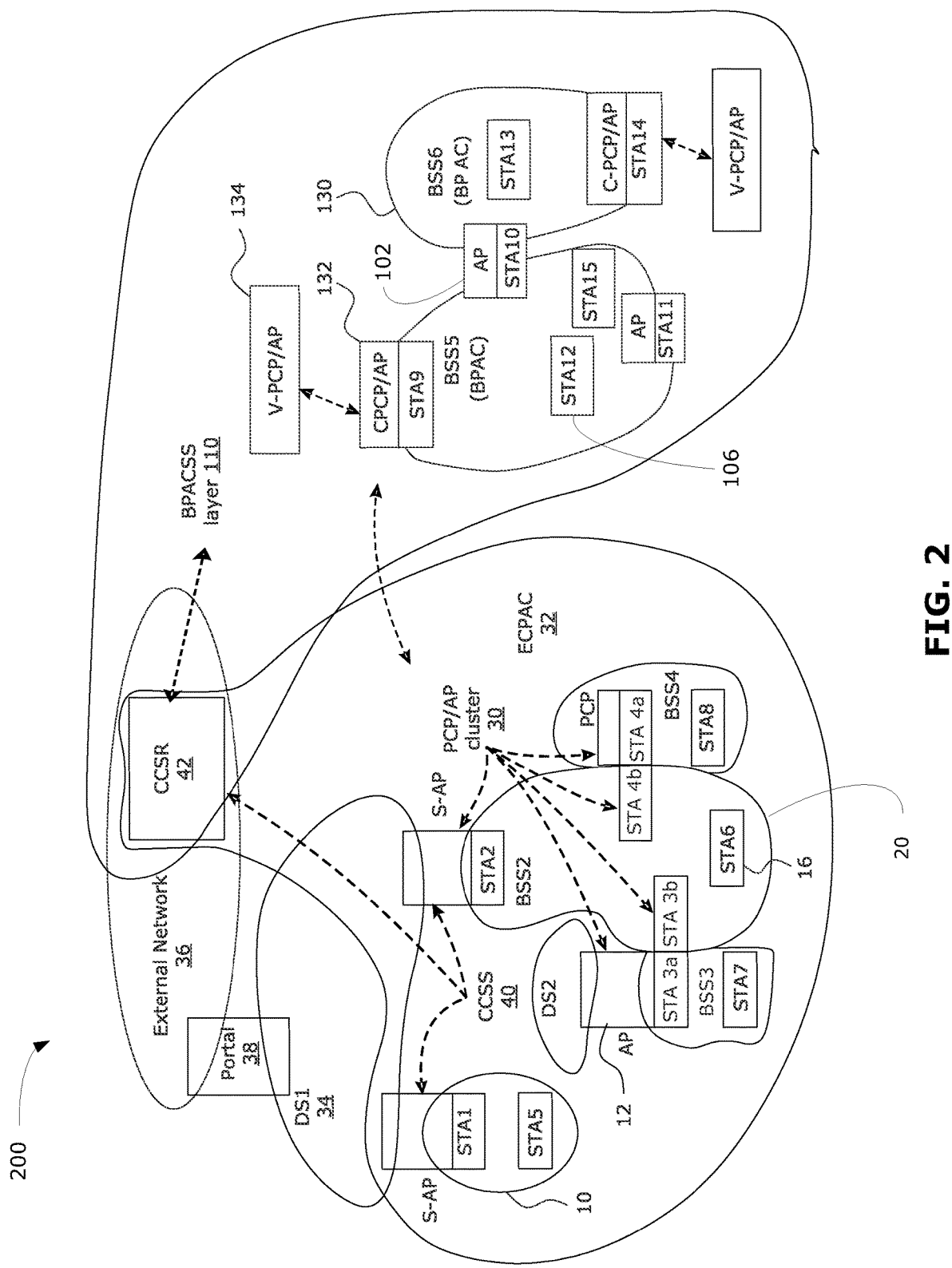
FIG. 2 illustrates a system implementing a legacy service set, as defined by IEEE 802.11ad, and also implementing a BSS PCP/AP cluster (BPAC) for FDMG communications.

FIG. 2 illustrates an example system 200 that includes both legacy devices (e.g., legacy STAs and legacy PCP/APs) and FDMG devices (e.g., FDMG STAs and FDMG PCP/APs). To avoid clutter, only one instance of each component is labeled in FIG. 2. Generally, an FDMG PCP/AP may perform legacy operations as well as FDMG operations. Similarly, an FDMG STA may perform legacy operations as well as FDMG operations.

The system 200 includes legacy devices (e.g., PCP/APs 12 and STAs 16) operating under 802.11ad and/or 802.11ay. A legacy device may be referred to as a DMG-capable or EDMG-capable device (also referred to as a DMG/EDMG device). The legacy devices operating under 802.11ad may engage in one-to-one communications within an 802.11ad-defined BSS 10. The legacy devices operating under 802.11ay may engage in one-to-one and/or one-to-multiple communications within an 802.11ay BSS 20. As shown in FIG. 2, multiple BSSs 10, 20 may be clustered together in a PCP/AP cluster 30. In a PCP/AP cluster 30, one PCP/AP 12 may serve as a synchronization PCP/AP (S-PCP/AP), to provide synchronization of PCP/APs 12 within the PCP/AP cluster 30. As a STA 16 moves within a PCP/AP cluster 30, the STA 16 is aware of which particular PCP/AP 12 within the cluster 30 is serving the STA 16. In order to be served by a different PCP/AP 12 within the PCP/AP cluster 30, the STA 16 is required to dissociate from its currently associated PCP/AP 12 and associate with a new PCP/AP 12. In the example shown, the system 200 includes distribution systems (DSs) 34 and an external network 36, which are excluded from the extended centralized PCP/AP cluster (ECPAC) 32. The external network 36 may be connected to other networks (e.g., a DS 34) via a portal 38. A centralized coordination service set (CCSS) 40 serves to coordinate multiple PCP/APs 12 within a PCP/AP cluster 30, via a centralized coordination service root (CCSR) 42. As defined by 802.11ad and 802.11ay, the CCSR 42 is an entity that provides synchronization and configuration services to S-PCP/APs; and the CCSS 40 includes one CCSR 42 and a set of one or more S-PCP/APs that are stationary with respect to their local environment while operating and connected to the CCSR. An extended centralized PCP/AP cluster (ECPAC) 32 is another form of a PCP/AP cluster. As defined by 802.11ad and 802.11ay, the ECPAC 32 includes a single CCSS 40, the set of centralized PCP/AP clusters 30 such that each S-PCP/AP of a centralized PCP/AP cluster 30 is within the CCSS 40, and all STAs 16 within the BSSs 10, 20 of the S-PCP/APs and PCP/APs of the centralized PCP/AP clusters 30. In accordance with the legacy 802.11ad and 802.11ay, there is only one PCP/AP 12 for each BSS 10, 20. A STA 16 may operate in more than one BSS 10, 20, and may function as a PCP/AP 12 in one BSS 10, 20 and as a STA 16 in another BSS 10, 20.

The system 200 also includes FDMG devices (e.g., FDMG PCP/APs 102 and FDMG STAs 106), which support implementation of BPAC BSSs 130. As discussed above, a single BPAC BSS 130 may include multiple PCP/APs 102 providing services to multiple STAs 106 simultaneously. One PCP/AP 102 in a BPAC BSS 130 may serve as a coordination PCP/AP (C-PCP/AP) 132. All PCP/APs within the BPAC BSS 130, except for the C-PCP/AP 132, are member PCP/APs (M-PCP/APs) 102 within the BPAC BSS 130 and are managed by the C-PCP/AP 132. The C-PCP/AP 132 establishes and maintains operations within the BPAC BSS 130, and provides services including coordination, synchronization and scheduling for all M-PCP/APs 102 of the BPAC BSS 130. The C-PCP/AP 132 may also coordinate the services provided by the M-PCP/APs 102, so as to provide a STA 106 of the BPAC BSS 130 with a requested set of services. Conceptually, the C-PCP/AP 132 may play a role similarly to the S-PCP/AP in a legacy PCP/AP cluster 30. However, whereas the legacy S-PCP/AP serves to coordinate among PCP/APs 12 of different BSSs 10, 20, the C-PCP/AP 132 serves to coordinate among M-PCP/APs 102 within a single BPAC BSS 130. The C-PCP/AP 132 may also serve to establish and manage formation of the BPAC BSS 130, including managing addition or removal of M-PCP/APs 102. A given PCP/AP 102 may participate in multiple BPAC BSSs 130 simultaneously.

A virtual PCP/AP (V-PCP/AP) 134 may be implemented for each BPAC BSS 130. The V-PCP/AP 134 is a medium access control (MAC) layer protocol managed by the C-PCP/AP 132. The V-PCP/AP 134 is a virtual representation of all the PCP/APs 102, 132 (including both C-PCP/AP 132 and M-PCP/APs 102) in the BPAC BSS 130. By representing the BPAC BSS 130 as a single V-PCP/AP 134 (rather than multiple individual PCP/APs 102, 132), the V-PCP/AP 134 simplifies and streamlines operations relating to the BPAC BSS 130, such as discovery, synchronization, association, authentication and quality of service (QoS)/quality of experience (QoE) traffic scheduling. For example, the V-PCP/AP 134 may enable all PCP/APs 102, 132 of the BPAC BSS 130 to be discovered and identified together by a STA 106 (e.g., as a single BSSID). As well, the V-PCP/AP 134 may enable the STA 106 to move between coverage of different PCP/APs 102, 132 within a single BPAC BSS 130 without having to re-authenticate with each PCP/AP 102, 132. Thus, the STA 106 may experience the BPAC BSS 130 as a single PCP/AP (e.g., similar to the experience in a legacy BSS 10, 20).

A BPAC service set (BPACSS) layer 110 may be implemented to enable management of a BPAC BSS 130 by the legacy CCSS 40 via the CCSR 42 (e.g., using clustering controls in accordance with 801.11ad/ay). The BPACSS layer 110 functions as a super set of BSSs 10, 20. This means that the BPACSS layer 110 inherits all the operations and services of a legacy BSS 10, 20. Thus, from the perspective of the CCSS 40, the BPACSS layer 110 enables the BPAC BSS 130 to appear to be equivalent to a legacy BSS 10, 20. In this way, the BPACSS layer 110 may enable the BPAC BSSs 130 to be backwards compatible with a legacy network, via the CCSR 42.

Figure 3:
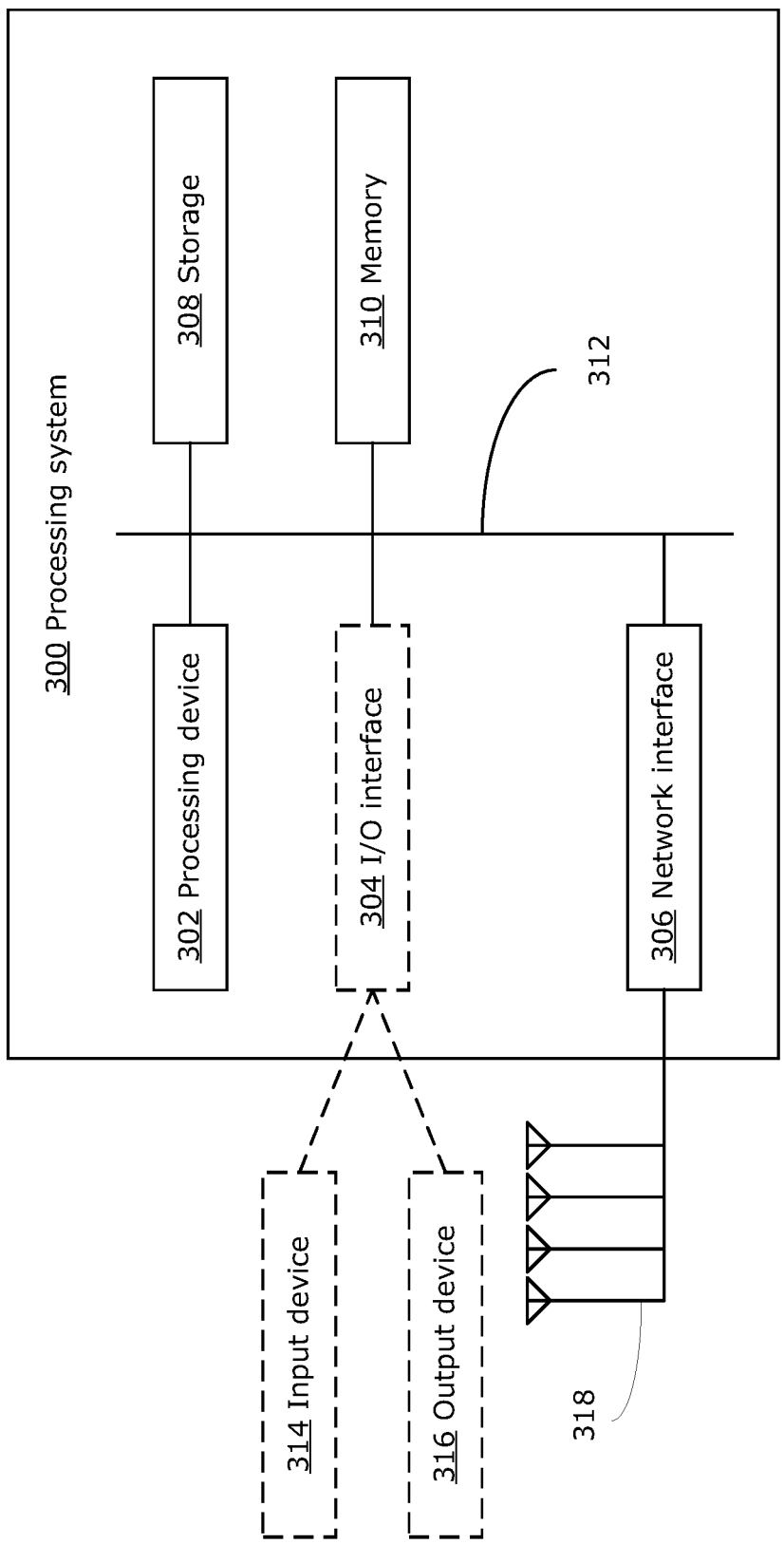
FIG. 3 is a block diagram of an example simplified processing system, which may be used to implement embodiments disclosed herein.

FIG. 3 is a block diagram of an example simplified processing system 300, which may be used to implement embodiments disclosed herein. The example processing system 300 described below, or variations thereof, may be used to implement legacy devices (e.g., legacy PCP/AP 12 and/or legacy STA 16) or FDMG devices (e.g., STA 106, C-PCP/AP 134 and/or M-PCP/AP 102). Other processing systems may be suitable for implementing embodiments described in the present disclosure, and may include components different from those discussed below. Although FIG. 3 shows a single instance of each component, there may be multiple instances of each component in the processing system 300.

The processing system 300 may include one or more processing devices 302, such as a processor, a microprocessor, an application-specific integrated circuit (ASIC), a field-programmable gate array (FPGA), a dedicated logic circuitry, or combinations thereof. The processing system 300 may optionally include one or more input/output (I/O) interfaces 304, to enable interfacing with one or more optional input devices 314 and/or output devices 316. The processing system 300 may include one or more network interfaces 306 for wired or wireless communication with a network (e.g., an intranet, the Internet, a P2P network, a WAN and/or a LAN) or other node. The network interface(s) 306 may include wired links (e.g., Ethernet cable) and/or wireless links (e.g., one or more antennas) for intra-network and/or inter-network communications.

The network interface(s) 306 may provide wireless communication via one or more antennas. In this example, multiple antennas together form an antenna array 318, which may perform both transmitting and receiving functions. The antenna array 318 may enable directional communications by enabling beamforming and beamtracking. In other examples there may be separate antennas or separate antenna arrays for transmitting and receiving.

The processing system 300 may also include one or more storage units 308, which may include a mass storage unit such as a solid state drive, a hard disk drive, a magnetic disk drive and/or an optical disk drive. The processing system 300 may include one or more memories 310, which may include a volatile or non-volatile memory (e.g., a flash memory, a random access memory (RAM), and/or a read-only memory (ROM)). The non-transitory memory(ies) 310 may store instructions for execution by the processing device(s) 302, such as to carry out example methods described in the present disclosure. The memory(ies) 310 may include other software instructions, such as for implementing an operating system and other applications/functions. In some examples, one or more data sets and/or modules may be provided by an external memory (e.g., an external drive in wired or wireless communication with the processing system 300) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 312 providing communication among components of the processing system 300, including the processing device(s) 302, optional I/O interface(s) 304, network interface(s) 306, storage unit(s) 308 and/or memory(ies) 310. The bus 312 may be any suitable bus architecture including, for example, a memory bus, a peripheral bus or a video bus.

In FIG. 3, the optional input device(s) 314 (e.g., a keyboard, a mouse, a microphone, a touchscreen, and/or a keypad) and optional output device(s) 316 (e.g., a display, a speaker and/or a printer) are shown as external to the processing system 300. In other examples, one or more of the input device(s) 314 and/or the output device(s) 316 may an internal component of the processing system 300.

Reference is again made to FIG. 2. As shown, the system 200 includes legacy devices as well as FDMG devices. In examples discussed below, the present disclosure provides a mechanism for channel access, which can be implemented in a BPAC BSS 130, in order to facilitate co-existence of FDMG devices and legacy devices within a BPAC BSS 130, as well as enable the BPAC BSS 130 to be backwards-compatible with legacy devices (e.g., legacy STAs 16 and legacy PCP/APs 12).

Figure 4:
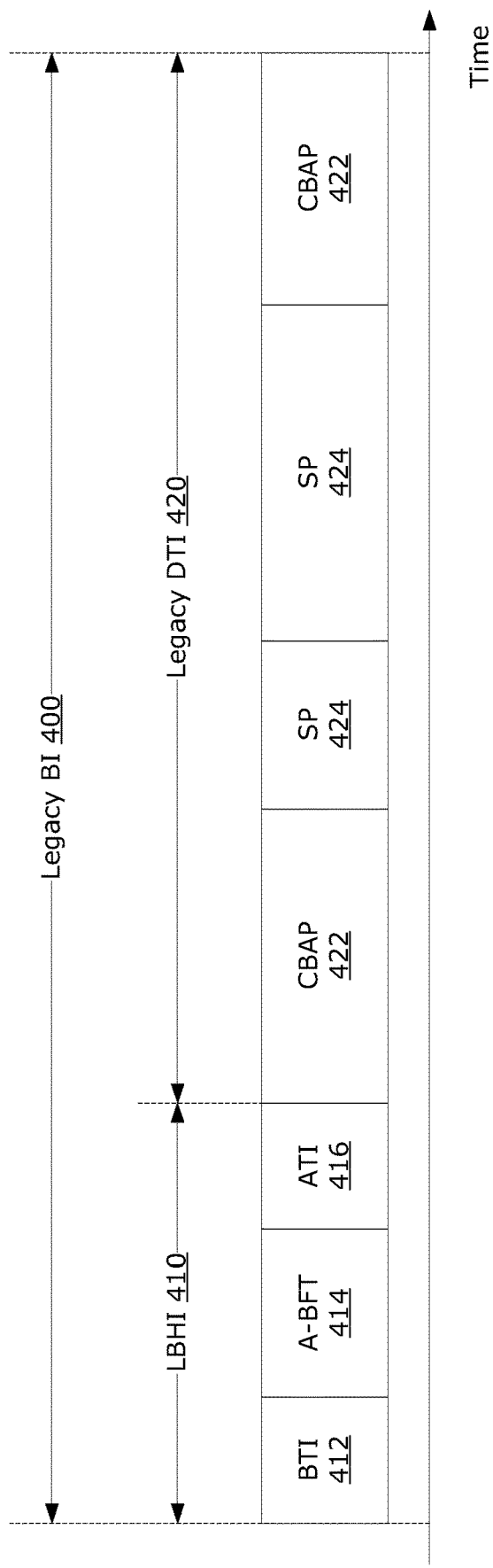
FIG. 4 illustrates an example legacy beacon interval (BI) for channel access by a legacy station.

To help in understanding the present disclosure, channel access by a legacy STA 16 is first described with reference to FIG. 4. A legacy STA 16 accesses a channel during a legacy beacon interval (BI) 400, based on a schedule. In a legacy BSS 10, 20, the schedule is typically generated by a legacy PCP/AP 12. In examples where the legacy STA 16 is within a BPAC BSS 130, the schedule may be generated by a C-PCP/AP 132, as discussed further below. The generated schedule is communicated to the STA 16 using legacy management/extension frames, such as DMG Beacon and Announce frames. In the present disclosure, the term "management/extension frame" may be used to refer to any management frame or beacon frame, which may include any information such as synchronization information, BSS identification, STA identification, beamforming information, scheduling information, or any other type of information relevant to channel access operations. In some cases, a management/extension frame may be simply referred to as a management frame, a beacon frame or a beacon. After receiving the scheduling information, the STA 16 can access the medium during the scheduled periods using access rules specific to that period. For ease of understanding, the following description will describe the legacy BI 400 in the context of a legacy BSS 10, 20. However, it should be understood that the legacy BI 400 may also be implemented in a BPAC BSS 130, as will be explained further below.

Medium time within the legacy BSS 10, 20 is divided into BIs, which are non-overlapped in time. As shown in FIG. 4, a legacy BI 400 may be divided into a legacy beacon header interval (LBHI) 410 and a legacy data transfer interval (DTI) 420. Generally, the LBHI 410 represents the contiguous period of time that starts at the target beacon transmission time (TBTT) of a legacy BI 400 and that ends no later than the beginning of the legacy DTI 420.

Beamforming training (BFT) is performed over different portions of a legacy BI 400. BFT is performed in order for a transmitting device and a receiving device to determine appropriate antenna settings for directional communication with each other. The device that initiates BFT (e.g., the PCP/AP 12) may be referred to as the initiator, and the other device that participates in BFT (e.g., the STA 16) may be referred to as the responder. In the present disclosure, beamforming training will be discussed in the context of beamforming between a PCP/AP as the initiator and a STA as the responder, for the purpose of illustration. Beamforming may also take place between other network entities as initiator and responder, for example between two STAs. 802.11ad defines a sector level sweep (SLS) stage and a beam refinement protocol (BRP) stage for BFT. The SLS stage is used in general to identify transmit sectors for directional communication between the initiator and the responder. The BRP stage is used to refine the antenna settings of both the initiator and the responder.

The LBHI 410 may include a beacon transmission interval (BTI) 412, an association BFT (A-BFT) period 414, and an announcement transmission interval (ATI) 416. The BTI 412 is an access period during which one or more DMG Beacon frames is transmitted by the PCP/AP 12. It should be noted that the BTI 412 is optional, and the legacy BI 400 may omit the BTI 412. A legacy STA 16 is prohibited from transmitting during the BTI 412. The A-BFT 414 is an access period during which beamforming training is performed between STAs 16 and the antenna that the PCP/AP 12 used to transmit a DMG Beacon frame during the immediately preceding BTI 412. The A-BFT 414 is optional and may be omitted from the legacy BI 400. Presence of the A-BFT 414 may be signaled in a preceding DMG Beacon frame transmitted in the BTI 412. The ATI 416 is an access period during which request-response management frames are transmitted between the PCP/AP 12 and the STA 16. The ATI 416 is optional and may be omitted from the legacy BI 400. Presence of the ATI 416 may be signaled in a preceding DMG Beacon frame transmitted in the BTI 412.

The legacy DTI 420 is an access period during which data frame exchanges are performed between the PCP/AP 12 and the STA 16 and/or between STAs 16 within the legacy BSS 10, 20. The DTI 420 may include one or more contention-based access periods (CBAPs) 422 and/or service periods (SPs) 424. Although FIG. 4 shows CBAPs 422 and SPs 424 in a particular order within the DTI 420, any order of CBAPs 422 and/or SPs 424 may take place during the DTI 420. CBAPs 422 may be enhanced distributed channel access (EDCA) periods and SPs 424 may be scheduled access periods.

For BFT, the SLS stage is carried out during the BHI 410 or during the DTI 420, and the BRP stage is carried out during the DTI 420. In the SLS stage, the initiator (e.g., the PCP/AP 12) performs an initiator transmit sector sweep (I-TXSS) by transmitting beacon frames (which are transmitted during the BTI 412) or sector sweep (SSW) frames (which are transmitted during the DTI 420) in different directions. The SSW or beacon frames are sequentially sent over different antenna sectors. SSW or beacon frames received by the responder (e.g., the STA 16) are used by the responder to identify (e.g., based on a calculated signal-to-noise ratio (SNR)) the preferred transmit sector for directional communications from the initiator to the responder. The responder (e.g., the STA 16) responds with a responder transmit sector sweep (R-TXSS), during which the responder sends SSW frames sequentially over different antenna sectors. These SSW frames also carry information transmitted from the responder back to the initiator, to allow the initiator to identify the preferred transmit sector for directional communications from the initiator to the responder. R-TXSS may take place during the A-BFT 414. SSW frames received by the initiator are also used by the initiator to identify (e.g., based on a calculated signal-to-noise ratio (SNR)) the preferred transmit sector for directional communications from the responder to the initiator. Sector sweep feedback (SSW-FB) is performed by the initiator to transmit information back to the responder, to allow the responder to identify the preferred transmit sector for directional communications from the responder to the initiator. SSW-BF may take place during the A-BFT 414 or the DTI 420.

Figure 5:
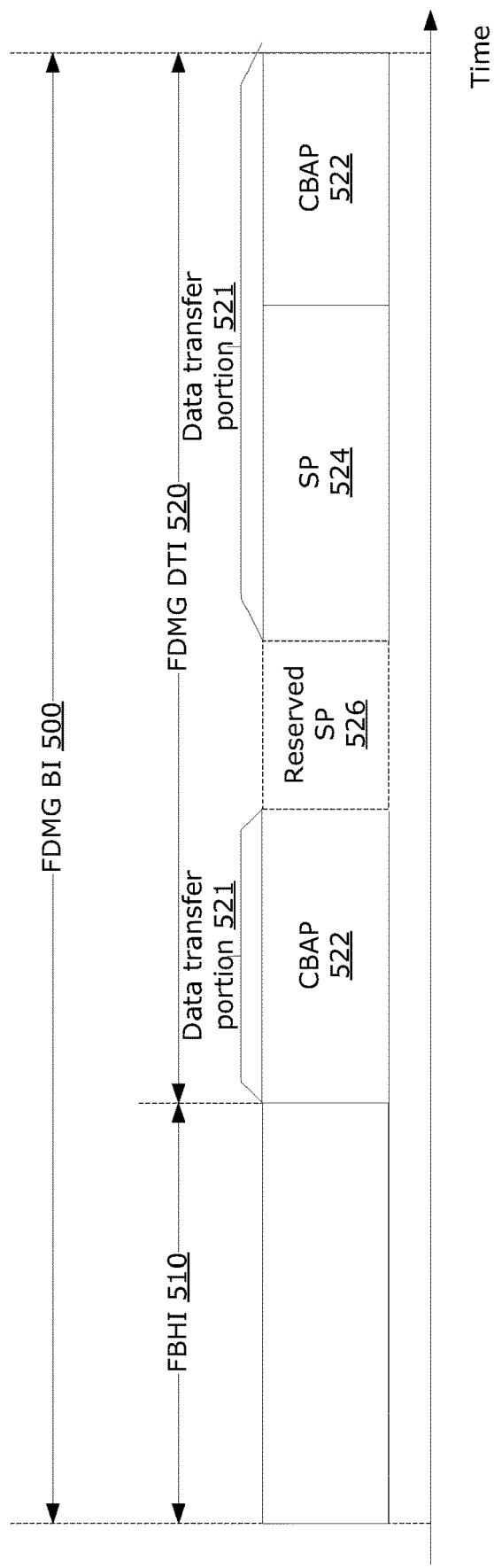
FIG. 5 illustrates an example FDMG BI for channel access by an FDMG-capable station.

FIG. 5 illustrates an example FDMG BI 500 during which an FDMG STA 106 accesses the channel medium. Similarly to the legacy BI 400, the FDMG BI 500 may be divided into an FDMG beacon header interval (FBHI) 510 and an FDMG DTI 520. The FDMG BI 500 may optionally include at least one reserved SP 526 to accommodate transmission of legacy management/extension frames during an LBHI 410, as discussed further below. In particular, the FDMG DTI 520 may include one or more data transfer portions 521, in which exchange of data frames may occur, as well as at least one reserved SP 526. Although the reserved SP 526 is illustrated as being scheduled at a particular time period within the FDMG DTI 520, it should be understood that the reserved SP 526 may take place anytime during the FDMG DTI 520, including at the very start (i.e., without any preceding data transfer portion 521) or at the very end (i.e., without any following data transfer portion 521) of the FDMG DT 520. The reserved SP 526 is a period of time reserved for transmission of legacy management/extension frames, to accommodate legacy STAs 16 in the BPAC BSS 130, as discussed further below. Data transmissions to and from the FDMG STA 106 are not scheduled during the reserved SP 526. Any time period of the FDMG DTI 520 that is outside of the reserved SP 526 is considered to be the data transfer portion(s) 521. The data transfer portion(s) 521 may include one or more CBAPs 522 and/or SPs 524 allowing data transmission to and from the FDMG STA 106. The reserved SP 526 may be omitted if no legacy device is present in the BPAC BSS 130. The FBHI 510 may be used to perform synchronization, BFT, discovery, information exchange between the PCP/AP 102, 132 and the STA 106 (e.g., information about device capabilities, parameters and/or operations, among others) and/or scheduling the FDMG DTI 520, among other functions, to support data transmission operations during the FDMG DTI 520.

Generally, in a BPAC BSS 130, channel access may involve only legacy BIs 400 (e.g., where there are only legacy STAs 16 in the BPAC BSS 130); channel access may involve only FDMG BIs 500 (e.g., where there are only FDMG STAs 106 in the BPAC BSS 130); or channel access may involve a combination of FDMG BIs and legacy BIs (e.g., where there is at least one legacy STA 16 and at least one FDMG STA 106 in the BPAC BSS 130).

In the case where there are only legacy STAs 16 in the BPAC BSS 130, channel access may be carried out similarly to channel access in a legacy BSS 10, 20, in which medium access time is divided into a sequence of legacy BIs 400. In some examples, where the FDMG STAs 106 are backwards-compatible, one or more FDMG STAs 106 may also operate in the BPAC BSS 130 using legacy BIs 400. This may be useful, for example, where there is a majority of legacy STAs 16 in the BPAC BSS 130 such that operation using only legacy BIs 400 is more efficient and/or simpler to implement.

Figure 6A:
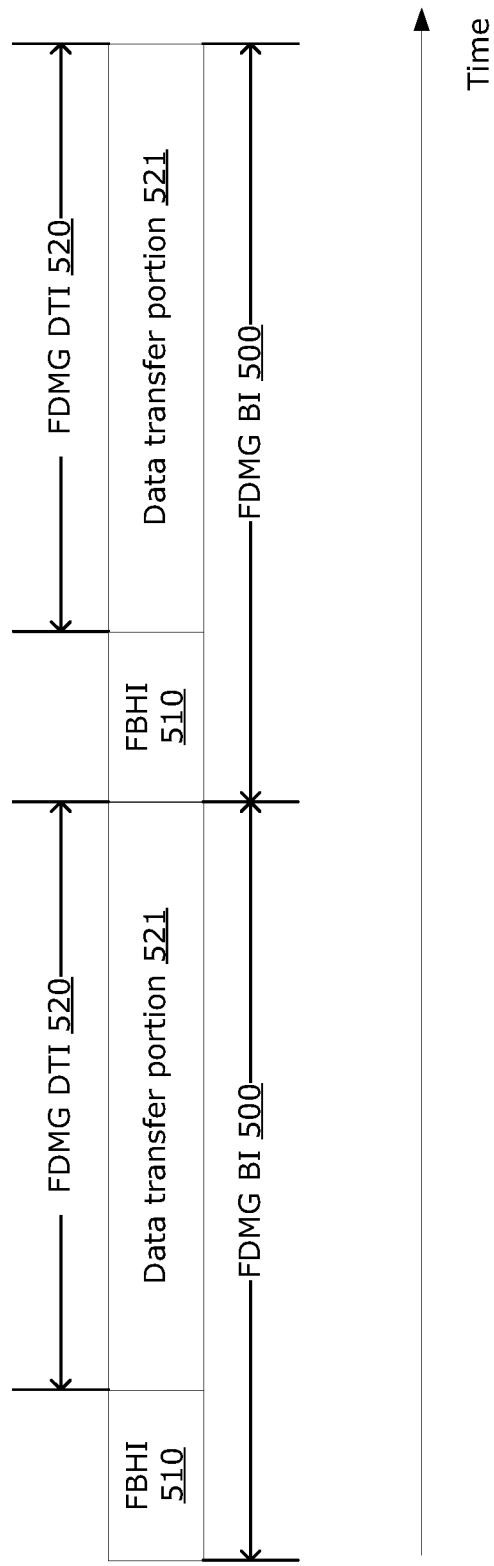
FIG. 6A and FIG. 6B illustrate example schedules of legacy BIs and FDMG BIs.

FIG. 6A illustrates an example schedule for channel access by FDMG STAs 106, in the case where there are no legacy devices in the BPAC BSS 130. In this case, the medium access time is divided into a sequence of only FDMG BIs 500, according to a schedule generated by the C-PCP/AP 132 and communicated to other M-PCP/APs 102 within the BPAC BSS 130. When there are no legacy STAs 16 to be accommodated, the FDMG BI 500 does not need to include the reserved SP 526. Thus, the data transfer portion 521 may last the entire time duration of the FDMG DTI 520. In other examples, the reserved SP 526 may be included even in the absence of legacy STAs 16 in the BPAC BSS 130. For example, the reserved SP 526 may be used to allow PCP/AP 132, 102 communications within the FDMG DTI 520 (e.g., for information exchange, scheduling or spatial sharing), or to allow occasional transmission of legacy beacons (by any PCP/AP 102, 132) for discovery of any new legacy STAs 16. As shown in FIG. 6A, the schedule that is generated by the C-PCP/AP 132 and communicated to M-PCP/APs 102 may define the schedule for the FBHI 510, the FDMG DTI 520 and optionally the reserved SP 526 (if included). The C-PCP/AP 132 may leave scheduling of one or more CBAPs 522 and/or SPs 524 within the data transfer portions 521 to be determined by the M-PCP/APs 102 (e.g., based on spatial sharing evaluations by the M-PCP/APs 102). In some examples, the schedule generated by the C-PCP/AP 132 may also define all CBAPs 522 and/or SPs 524 within the data transfer portions 521.

Figure 6B:
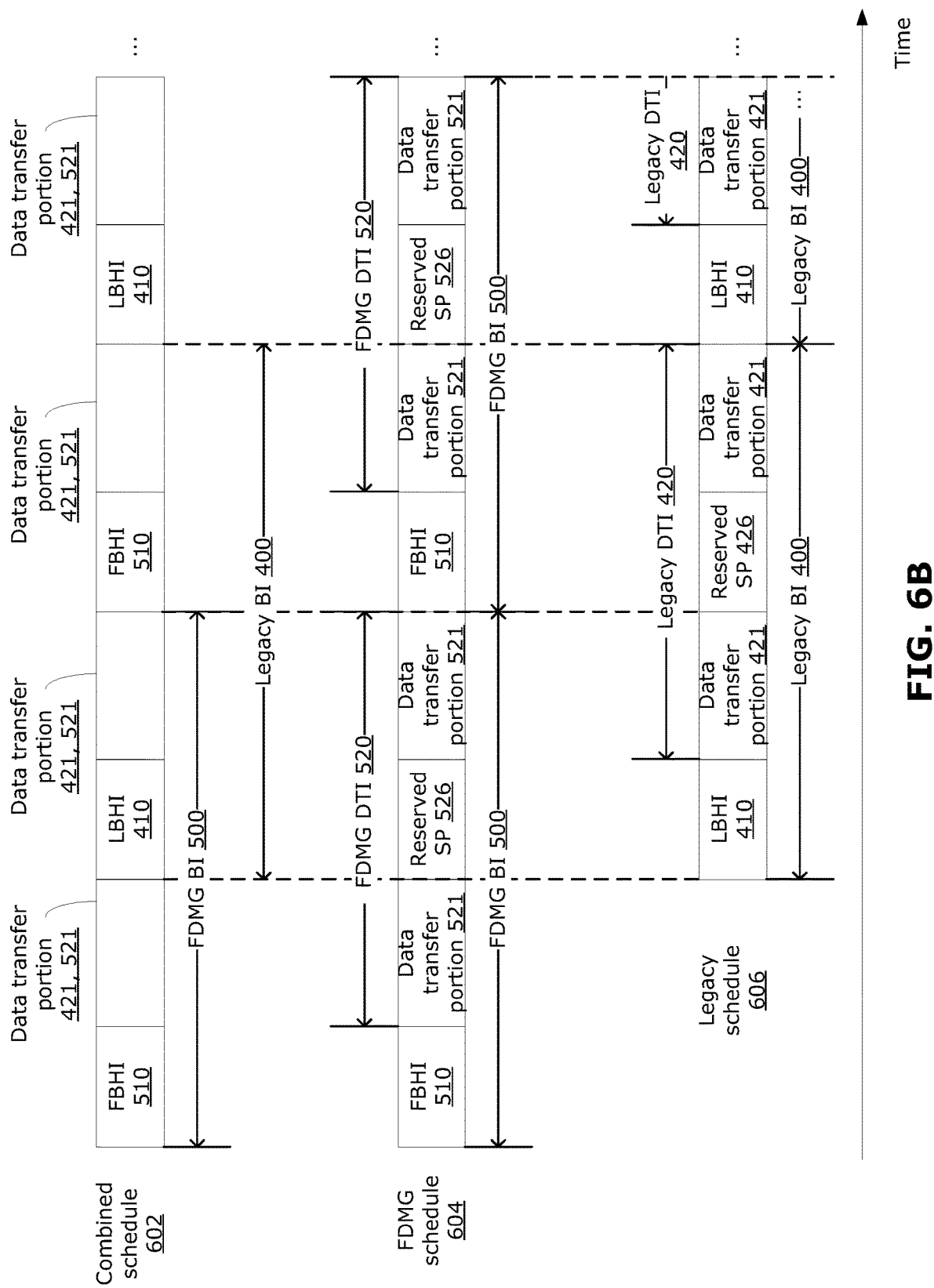

FIG. 6B illustrates example schedules for channel access by FDMG STAs 106 and legacy STAs 16, in the case where there is at least one FDMG STA 106 and at least one legacy STA 16 in a single BPAC BSS 130. The C-PCP/AP 132 is responsible for scheduling both legacy BIs 400 and FDMG BIs 500 within the BPAC BSS 130, to coordinate channel access by FDMG STAs 106 as well as legacy STAs 16. In particular, channel access within the BPAC BSS 130 allows a legacy BI 400 to partially overlap in time with an FDMG BI 500. As shown in FIG. 6B, the schedules generated by the C-PCP/AP 132 and communicated to M-PCP/APs 102 may define the schedule for the FBHI 510, the FDMG DTI 520 and the reserved SP 526 for the FDMG BI 500, and the schedule for the LBHI 410, legacy DTI 420 and the reserved SP 426 for the legacy BI 400. The C-PCP/AP 132 may leave scheduling of one or more CBAPs and/or SPs within the data transfer portions 421, 521 to be determined by the M-PCP/APs 102 (e.g., based on spatial sharing evaluations by the M-PCP/APs 102). In some examples, the schedule generated by the C-PCP/AP 132 may also define all CBAPs and/or SPs within the data transfer portions 421, 521.

In FIG. 6B, a combined schedule 602, an FDMG schedule 604 and a legacy schedule 606 are shown, to illustrate coexistence of FDMG STAs 106 and legacy STAs 16 within a common BPAC BSS 130. In some examples, a PCP/AP 102, 132 may implement only one of the FDMG schedule 604 or the legacy schedule 606. For example, the FDMG schedule 604 may be used by FDMG STAs 106 and PCP/APs 102, 132 serving FDMG STAs 106 in an FDMG mode of operation, and the legacy schedule 606 may be used by legacy STAs 16 and PCP/APs 102, 132 serving legacy STAs 16 in a legacy mode of operation. In some examples, a single PCP/AP 102, 132 may be capable of operation in both the FDMG mode and the legacy mode. In such a case, the PCP/AP 102, 132 may implement both the FDMG schedule 604 and the legacy schedule 606, or may implement the combined schedule 602. The PCP/AP 102, 132 may thus serve legacy STAs 16 during the LBHI 410, serve FDMG STAs 106 during the FBHI 510, and serve legacy STAs 16 and/or FDMG STAs 106 during the data transfer portion 421, 521. In some cases, the combined schedule 602 is not used and may not need to be generated. The C-PCP/AP 132 may set both the FDMG schedule 604 and the legacy schedule 606 (and also the combined schedule 602 if used), including scheduling reserved SPs and coordinating how the FDMG schedule 604 and the legacy schedule 606 overlap.

The FDMG schedule 604 includes sequential FDMG BIs 500. The FDMG schedule 604 may be set by the C-PCP/AP 132 and communicated to M-PCP/APs 102 (e.g., via a synchronization signal). Each FDMG BI 500 is established by a respective FBHI 510, and the duration of each FDMG BI 500 is determined according to the respective FBHI 510. The FDMG DTI 520 includes one or more data transfer portions 521 for exchanging data frames, and at least one reserved SP 526 during which data transfer does not occur. In particular, the reserved SP 526 is scheduled to permit transmission of legacy management/extension frames during the LBHI 410 (including the legacy BTI 412, A-BFT 414 and/or ATI 416) of an overlapping legacy BI 400. The reserved SP 526 is set to be a length of time sufficient for legacy operations to be performed during the LBHI 410. If the reserved SP 526 is used to enable beacon transmission during the LBHI 410, non-legacy (e.g., FDMG) operations are not permitted during the reserved SP 526.

The legacy schedule 606 includes sequential legacy BIs 400. The legacy schedule 606 may be set by the C-PCP/AP 132 and communicated to M-PCP/APs 102 (e.g., via interval scheduling information). Each legacy BI 400 is established by a respective LBHI 410, and the duration of each legacy BI 400 is determined according to the respective LBHI 410. The legacy DTI 420 includes one or more data transfer portions 421 for exchanging data frames, and at least one reserved SP 426 during which data transfer does not occur. In particular, the reserved SP 426 is scheduled to permit transmission of non-legacy management/extension frames, such as FDMG management/extension frames, during the FBHI 510 of an overlapping FDMG BI 500. The reserved SP 426 is set to be a length of time sufficient for FDMG operations to be performed during the FBHI 510. If the reserved SP 426 is used to enable beacon transmission during the FBHI 510, legacy operations are not permitted during the reserved SP 426.

The data transfer portion 521 of an FDMG BI 500 and the data transfer portion 421 of a legacy BI 400 may be jointly scheduled (e.g., scheduling information may be communicated in the FBHI 510 and LBHI 410 to schedule respective data transfer portions 521, 421 at the respective STAs 106, 16). Similarly, the FDMG schedule 604 and the legacy schedule 606 may align the SPs and CBAPs of the data transfer portion 521 of the FDMG BI 500 with the corresponding SPs and CBAPs of the data transfer portion 421 of a legacy BI 400. This may enable communications with an FDMG STA 106 to be conducted at the same time as communications with a legacy STA 16.

In implementing the legacy schedule 606, during the LBHI 410, C-PCP/AP or M-PCPs/APs 102 may transmit a legacy beacon frame, SSW frame, SSW-Feedback frame, SSW-ACK frame and/or other management/extension frames. Legacy beacons transmitted by different PCPs/APs 102 within a single BPAC BSS 130 may use the single common BSSID provided by the V-PCP/AP 134, or each PCP/AP 102 may use its own different BSSID as in 802.11ad and 802.11ay. Beamforming operations and exchanges of request/response frames may take place during the LBHI 410, as defined in 802.11ad and 802.11ay. The C-PCP/AP 132 may play a role in coordination of M-PCP/APs 102 and scheduling of operations during the DTI 420. The M-PCP/AP 102 may play a role similar to a legacy PCP/AP 12. Unlike in legacy operations, in which beacon information is not transmitted during the legacy DTI 420, in the disclosed examples, an LBHI 410 carrying beacon information can be scheduled during the reserved SP 526 of the FDMG DTI 520. Similarly, an FBHI 510 carrying beacon information can be scheduled during the reserved SP 426 of the legacy DTI 420.

Figure 7A:
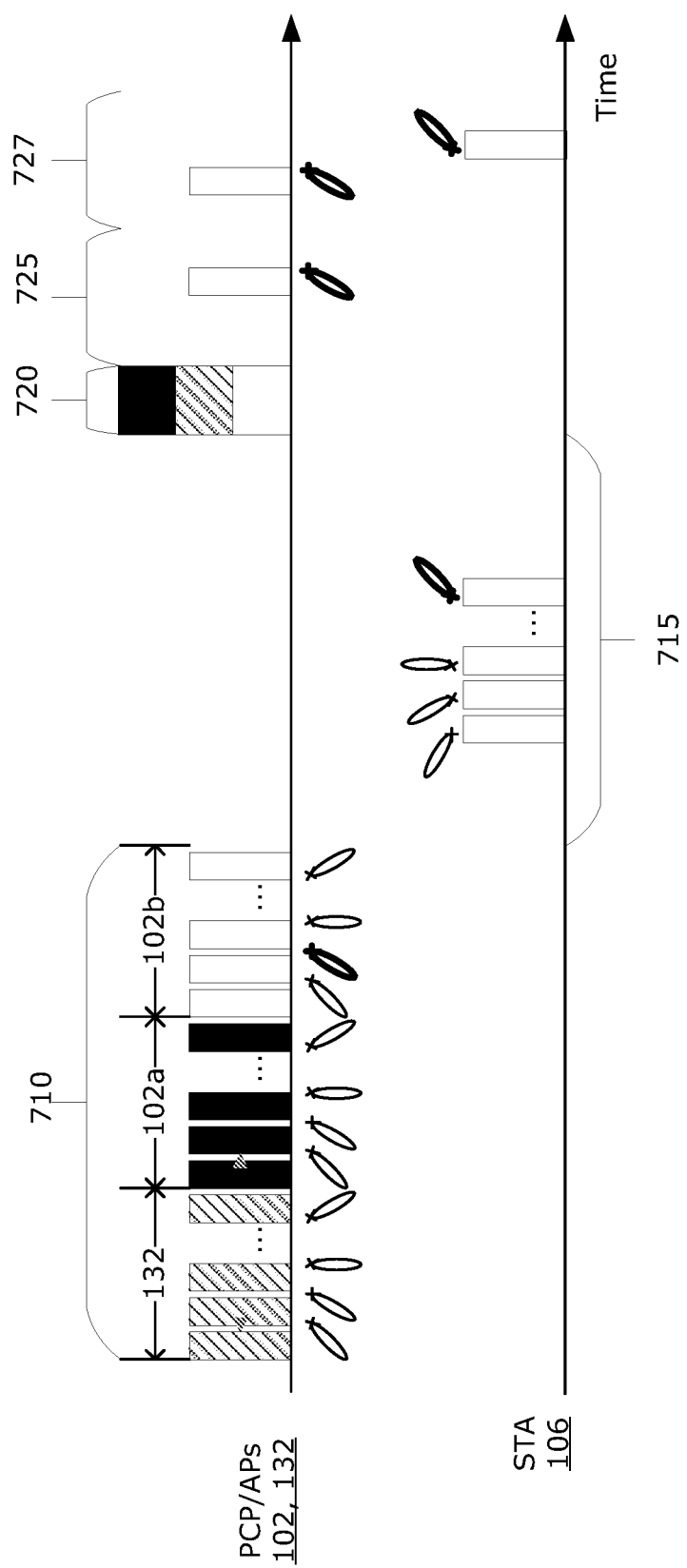
FIGS. 7A, 7B and 7C are timing diagrams illustrating example operations for beamforming, during an FDMG BI.

FIG. 7A is a timing diagram illustrating example channel access operations that may take place in the BPAC BSS 130. Similar to the LBHI 410, the FBHI 510 may be used to exchange information for channel access by the STA 106, including performing beamforming operations (e.g., BFT and discovery) between the initiator (e.g., the PCP/AP 102, 132) and the responder (e.g., the STA 106). For simplicity, FIG. 7A illustrates operations between three PCP/APs, in this case one C-PCP/AP 132 and two M-PCP/APs 102 (individually labelled as 102a, 102b) and one STA 106. However, it should be understood that the operations shown in FIG. 7A can be extended to greater or fewer number of PCP/APs 102, 132 and more than one STA 106.

In each FDMG BI 500, each M-PCP/AP 102 is synchronized to the C-PCP/AP 132 (e.g., by use of a timing synchronization function (TSF) timer). The PCP/AP 102, 132 may send timing information (e.g., a timestamp) to synchronize the timer of the respective STAs 106. Synchronization between the C-PCP/AP 132 and an M-PCP/AP 102 may be achieved during beamforming (BF) operations and/or coordination operations. For example, if BF operations are led by the C-PCP/AP 132 followed by other M-PCP/APs 102 sequentially (as shown in FIG. 7A) and at least one communication link is established between the C-PCP/AP 132 and each M-PCP/AP 102, the TSF timer of each M-PCP/AP 102 may be set to be the TSF timer of C-PCP/AP 132 so that synchronization of PCP/APs 102, 132 may be inherent or implied.

Channel access operations include the transmission of management/extension frames, such as beamforming (BF) frames, by the initiator. This phase may be referred to as initiator transmit BF (I-TX BF) 710 (e.g., where a responder may use a quasi-omni antenna pattern). In some cases (e.g., where a responder may use a directional antenna pattern), the I-TX BF 710 may be simultaneous with a responder receive BF (R-RX BF) phase (not shown) at the STA 106, and this phase may be referred to as a simultaneous I-TX BF and R-RX BF phase. As shown in FIG. 7A, I-TX BF 710 (or simultaneous I-TX BF and R-RX BF) may involve each PCP/AP 102, 132, in sequence starting with the C-PCP/AP 132, transmitting respective BF frames. If there are multiple STAs 106, R-RX BF for each STA 106 may take place in parallel. As discussed previously, for legacy devices, BFT includes the initiator and responder performing I-TXSS and R-TXSS. In the FBHI 510, I-TX BF 710 by the initiator takes the place of I-TXSS, and I-TX BF 710 may take place during a period in the FBHI 510 that corresponds to the BTI 412 of the LBHI 410. Each PCP/AP 102, 132 transmits a respective plurality of management/extension frames (e.g., BF frames) over different transmit sectors. Because there may be a high number of transmit sectors for each PCP/AP 102, 132 (e.g., up to 128 sectors or more), the BF frame may be designed to be shorter than a legacy beacon frame. The BF frames transmitted during I-TX BF 710 (or simultaneous I-TXBF and R-RX BF) may include only information related to timing and BF (e.g., TSF timer, BSS ID, antenna ID and/or sector ID). The BF frame may carry information in a MAC payload. Thus, I-TX BF 710 may take place over a shorter time period than I-TXSS, for a given number of transmit sectors.

In the example of FIG. 7A, at least one management/extension frame (indicated in bold outline) from the M-PCP/AP 102b is received by the STA 106. For simplicity, the following description refers to only the M-PCP/AP 102b as the initiator and the STA 106 as the responder, however it should be understood that similar operations may be performed between any STA 106 and any C-PCP/AP 132 or M-PCP/AP 102. The STA 106 responds with transmission of management/extension frames (e.g., BF frames) during a responder transmit BF (R-TX BF) 715 phase (e.g., where the initiator may use a quasi-omni antenna pattern). In some cases (e.g., where an initiator may use a directional antenna pattern), the R-TX BF 715 may be simultaneous with an initiator receive BF (I-RX BF) phase (not shown), and this phase may be referred to as a simultaneous R-TX BF and I-RX BF phase. In the FBHI 510, R-TX BF 715 by the responder takes the place of R-TXSS in legacy operations, and R-TX BF 715 may take place during a period in the FBHI 510 that corresponds to the A-BFT 414 of the LBHI 410. The STA 106 transmits BF frames over different transmission sectors. In some examples, the BF frames transmitted at R-TX BF 715 may be designed to be shorter than legacy SSW frames, so that R-TX BF 715 may take place over a shorter time period than R-TXSS, for a given number of transmission sectors. The BF frames transmitted by the STA 106 during the R-TX BF 715 (or simultaneous R-TX BF and I-RX BF) includes I-TX BFT feedback information that may be used by the M-PCP/AP 102b to adjust its antennas for directional communication with the STA 106. At least one management/extension frame (indicated in bold outline) from the STA 106 is received by the M-PCP/AP 102b in order to establish a reliable link for further communications between M-PCP/AP 102b and STA 106.

After the initial BFT and discovery at I-TX BF 710 (or simultaneous I-TX BF and R-RX BF) and R-TX BF 715 (or simultaneous R-TX BF and I-RX BF), a PCP/AP coordination interval 720 may be allocated to allow the PCPs/APs 102, 132 to exchange information obtained through the initial BFT. The exchanged information may be used by the M-PCP/AP 102b, together with information in the received R-TX BF frame, to identify a preferred transmit sector for transmission by the M-PCP/AP 102b to the STA 106. During the PCP/AP coordination interval 720, the C-PCP/AP 132 may receive information from the M-PCP/APs 102, to help identify the type of channel access requested by the STA 106. The C-PCP/AP 132 may serve the STA 106 itself, or may assign another M-PCP/AP 102 to serve the STA 106. In this example, the M-PCP/AP 102b is assigned to serve the STA 106. If it has been determined that the STA 106 is a legacy STA, then the C-PCP/AP 132 may assign the M-PCP/AP 102b to serve the legacy STA in a legacy mode of operation.

The PCP/AP coordination interval 720 is followed by an R-TX BFT feedback 725 phase. During R-TX BFT feedback 725, the M-PCP/AP 102b forwards the related R-TX BFT results to the STA 106, using the preferred transmit sector. The R-TX BFT feedback information transmitted to the STA 106 may include, for example, beacon information (e.g., beacon fields that were omitted during I-TX BF 710 in order to use shorter BF frames), as well as scheduling information (e.g., schedule of one or more data transfer portions 521 and/or reserved SP 526). The scheduling information may have been provided to the M-PCP/AP 102b by the C-PCP/AP 132, based on whether the M-PCP/AP 102b is to operate in FDMG mode or in legacy mode. R-TX BFT feedback 725 may take the place of SSW-FB in legacy beamforming, and R-TX BFT feedback 725 may take place during a period in the FBHI 510 that corresponds to the A-BFT 414 of the LBHI 410. If the R-TX BFT feedback includes scheduling information, this may be similar to the announcement frame transmitted during the ATI 416 of the LBHI 410. In some examples, request and response frames 727 may be exchanged between the M-PCP/AP 102b and STA 106. Similar to legacy operations, example request and response frames may include any type of management frame, including acknowledgement (ACK) frame, grant frame, poll frame, request-to-send (RTS) frame, clear-to-send (CTS) frame, DMG CTS, or service period request (SPR) frame, among others.

If there are multiple STAs 106 involved in the beamforming operations, the sequence of R-TX BF 715, PCP/AP coordination interval 720 and/or R-TX BFT feedback 725 may take place for each STA 106 in parallel and/or sequentially. Generally, transmissions to/from the multiple STAs 106 during any portion of channel access operations may take place in parallel or in sequence, and a combination of parallel and sequential operations may be used. For example, R-TX BF 715 may take place in parallel for all the STAs 106 and R-TX BFT feedback 725 may take place for each STA 106 in sequence.

After R-TX BFT feedback 725, TX (or both TX and RX) channel access operations for both the initiator (the M-PCP/AP 102b in this example) and the responder (the STA 106 in this example) are complete. Exchange of data frames may then take place in the following one or more scheduled data transfer portions 521.

Figure 7B:
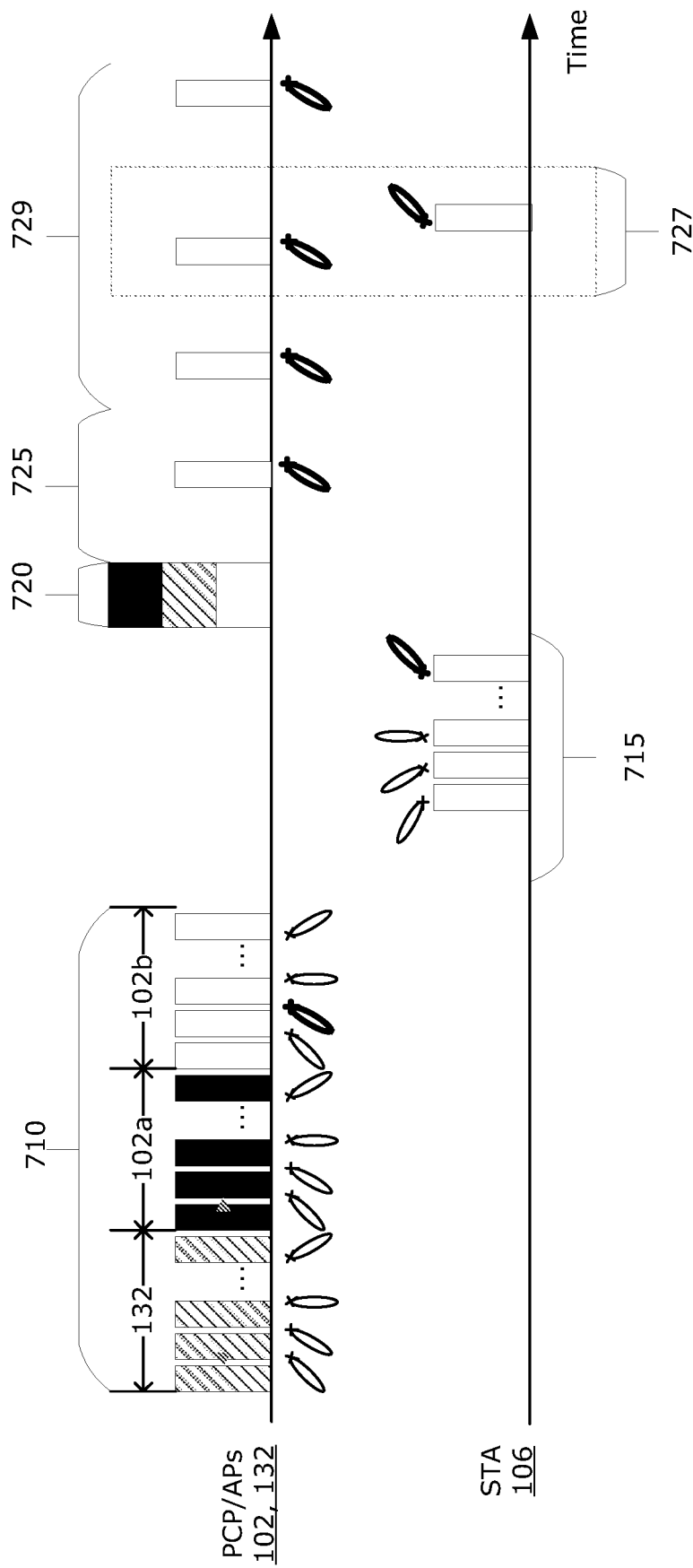

FIG. 7B is a timing diagram illustrating another set of example channel access operations that may take place in the BPAC BSS 130. FIG. 7B is similar to FIG. 7A, except that multiple frames may be transmitted following R-TX BFT feedback 725. Other operations preceding R-TX BFT feedback 725 may be similar and are not repeated here.

In the example of FIG. 7B, following R-TX BFT feedback 725, one or more additional management frames 729 may be transmitted to communicate the beacon information and/or schedule information, separately from the feedback frame. The request and response frames 727 may be among the additional management frames transmitted between the M-PCP/AP 102b and STA 106.

The order in which the management frames are transmitted following R-TX BFT feedback 725 may be varied. If there are multiple STAs 106 involved in the operations, multiple STAs 106 may receive the management/extension frames transmitted by the M-PCP/AP 102b simultaneously or sequentially. Generally, transmissions may be received by the multiple STAs 106 in parallel or in sequence during any portion of channel access operations. For example, beacon information may be received simultaneously by all the STAs 106 and transmission of schedule information may be received by each STA 106 in sequence.

Figure 7C:
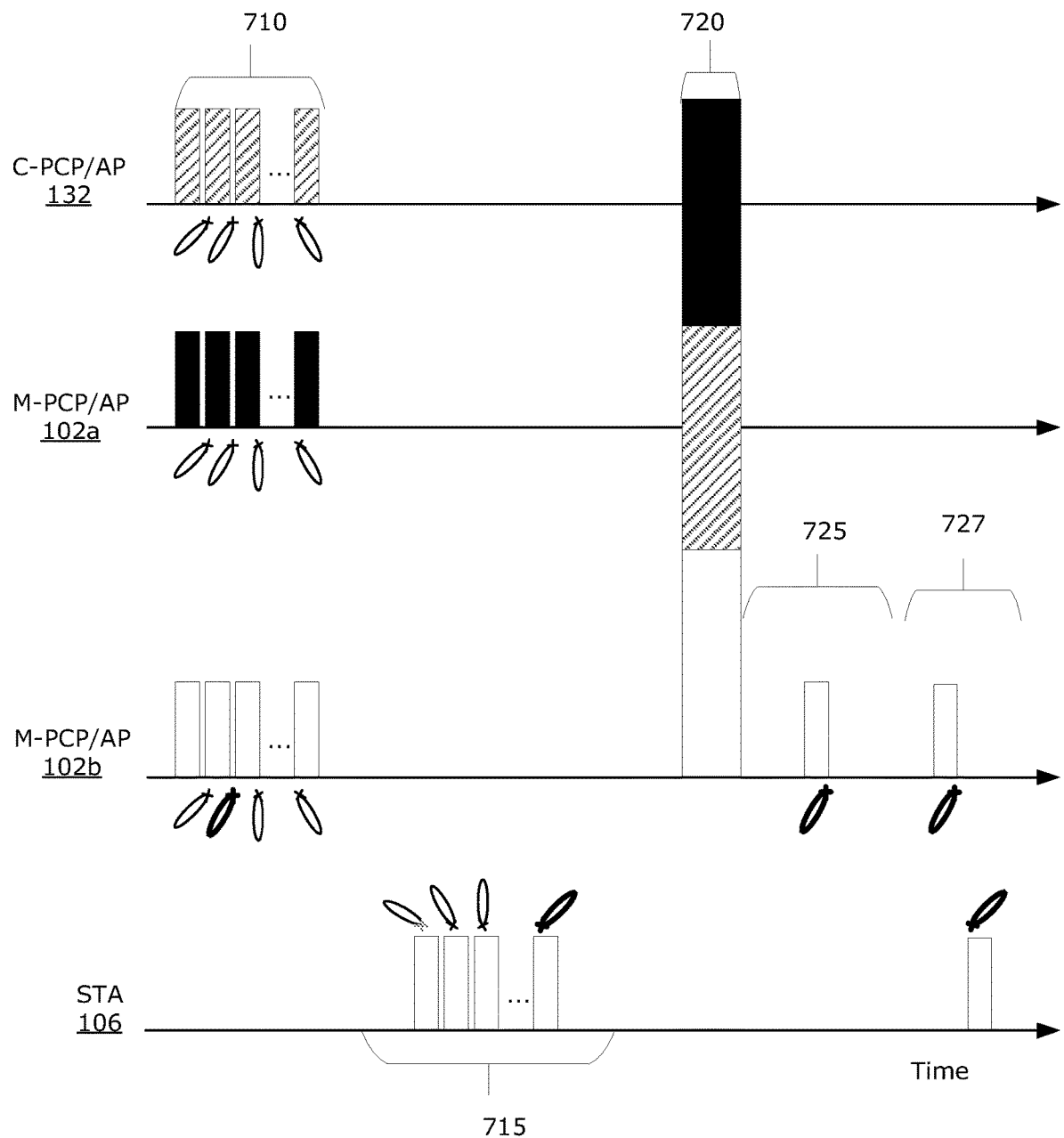

FIG. 7C is a timing diagram illustrating another example of channel access operations that may take place in a BPAC BSS 130. In the example of FIG. 7C, I-TX BF 710 takes place in parallel for the PCP/APs 102, 132, rather than in sequence. Other operations following I-TX BF 710 may be similar to that shown in FIG. 7A or FIG. 7B and are not repeated here.

The operations illustrated in FIGS. 7A, 7B and 7C, which may take place during the FBHI 510 and involve transmission of beacon information, may be scheduled during the reserved SP 426 of a legacy DTI 420. Although FIGS. 7A, 7B and 7C show the M-PCP/AP 102b performing operations to establish the communication link with the STA 106 in order to serve the STA 106, it should be understood that similar operations may be performed by any other M-PCP/AP 102 or the C-PCP/AP 132, in order to serve the STA 106.

Figure 8:
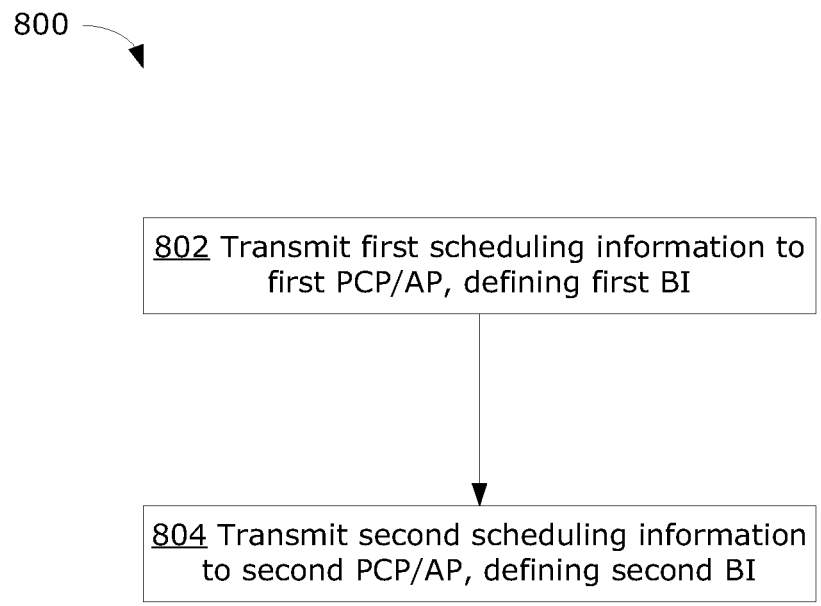
FIG. 8 is a flowchart illustrating an example method for scheduling channel access in a BPAC BSS.

FIG. 8 is a flowchart illustrating an example method 800 for scheduling channel access in the BPAC BSS 130. The method 800 may be used by the C-PCP/AP 132 to schedule FDMG BI 500s and legacy BIs 400, for example as illustrated in FIG. 6B.

At 802, the C-PCP/AP 132 transmits a first set of scheduling information to a first M-PCP/AP 102 in the BPAC BSS 130, to define a BI schedule for the first M-PCP/AP 102. The scheduling information schedules a BHI and DTI for the BI, including a reserved SP during the DTI. In some examples, the C-PCP/AP 132 may itself implement the first set of scheduling information, in which case the first set of scheduling information may or may not be transmitted.

For example, if the first M-PCP/AP 102 is serving one or more FDMG STAs 106, the C-PCP/AP 132 transmits the FDMG schedule 604 to the first M-PCP/AP 102. The FDMG schedule 604 schedules the FBHI 510 and FDMG DTI 520, including the reserved SP 526 within the FDMG DTI 520. As noted above, the reserved SP 526 is reserved for transmission of legacy management/extension frames during the LBHI 410, and data transfer to/from the first M-PCP/AP 102 is prohibited during the reserved SP 526. In some examples, the C-PCP/AP 132 may inform the M-PCP/AP 102 about the scheduling of an LBHI 410, and the M-PCP/AP 102 may make the determination that the reserved SP 526 should be scheduled at the corresponding time in the FDMG BI 500.

In some examples, the first scheduling information may further schedule one or more data transfer portions 521 within the FDMG DTI 520. In other examples, it may not be necessary to explicitly schedule the data transfer portion(s) 521. Instead, any portion of the FDMG DTI 520 that has not been scheduled as the reserved SP 526 may be considered a data transfer portion 521 during which data transfer may take place.

At 804, the C-PCP/AP 132 transmits a second set of scheduling information to a second M-PCP/AP 102 in the BPAC BSS 130, to define a second BI schedule. The scheduling information schedules a BHI and DTI for the BI, including a reserved SP during the DTI.

For example, if the second M-PCP/AP 102 is serving or has been assigned to serve one or more legacy STAs 16 (which may include one or more FDMG STAs 106 operating as a legacy device), the C-PCP/AP 132 transmits the legacy schedule 606 to the second M-PCP/AP 102. The legacy schedule 606 schedules the legacy BHI 410 and legacy DTI 420, including the reserved SP 426 within the legacy DTI 420. The reserved SP 426 is reserved for transmission of non-legacy management/extension frames, such as FDMG management/extension frames during the FBHI 510, and data transfer to/from the second M-PCP/AP 102 is prohibited during the reserved SP 426. In some examples, the C-PCP/AP 132 may inform the M-PCP/AP 102 about the scheduling of a FBHI 510, and the M-PCP/AP 102 may make the determination that the reserved SP 426 should be scheduled at the corresponding time in the legacy BI 400.

In some examples, the second scheduling information may further schedule one or more data transfer portions 421 within the legacy DTI 420. In other examples, it may not be necessary to explicitly schedule the data transfer portion(s) 421. Instead, any portion of the legacy DTI 420 that has not been scheduled as the reserved SP 426 may be considered a data transfer portion 421 during which data transfer may take place.

The scheduling information may then be used by the PCP/AP 102, 132 to schedule beamforming operations and data transfer with respective STAs. It should be noted that 802 and 804 can be performed sequentially or in parallel. For example, the C-PCP/AP 132 can use DL MU-MIMO techniques to transmit the first and second scheduling information to the first and second M-PCP/APs 102, respectively, at the same time.

In some examples, an M-PCP/AP 102 may operate in both FDMG mode and legacy mode, and may transmit both FDMG management/extension frames and legacy management/extension frames. In that case, the C-PCP/AP 132 may transmit both the first and second scheduling information to the same M-PCP/AP 102. Alternatively, the C-PCP/AP 132 may transmit a combined set of scheduling information (e.g., defining a combined schedule, such as shown in FIG. 6B) to the M-PCP/AP 102. Similarly, the C-PCP/AP 132 may itself implement both first and second scheduling information, or combined scheduling information.

Figure 9:
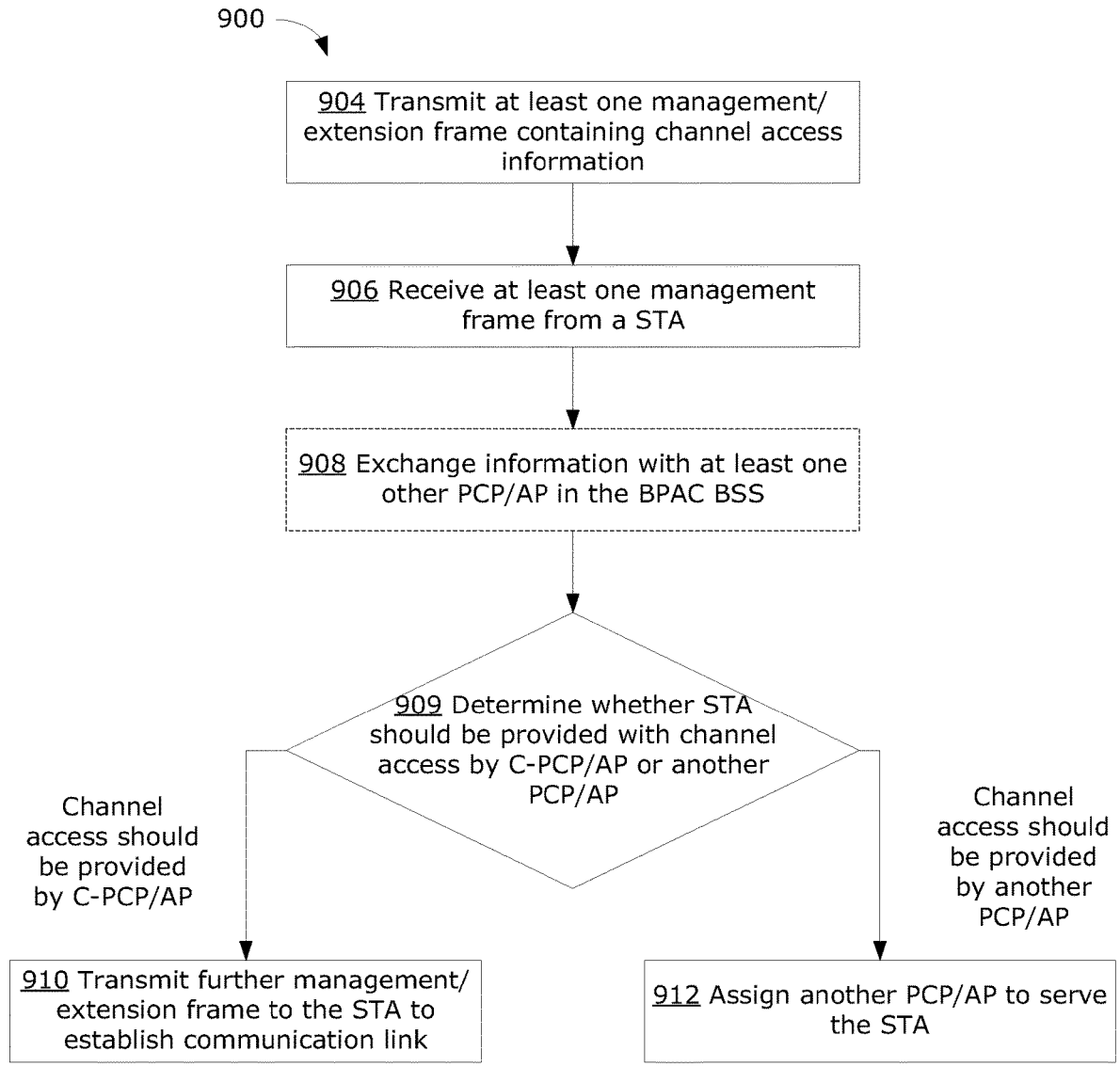
FIG. 9 is a flowchart illustrating an example method for enabling channel access by a STA in a BPAC BSS.

FIG. 9 is a flowchart illustrating an example method 900 for channel access by a STA within a BPAC BSS 130. The method 900 may be used to enable channel access by an FDMG STA 106 or by a legacy STA 16. Beamforming operations for legacy STAs 16 in the BPAC BSS 130 may be performed according to legacy standards (e.g., 802.11ad or 802.11ay). Beamforming operations for FDMG STAs 106 may be according to the operations discussed above with reference to FIGS. 7A-7C. The method 900 may be performed by a C-PCP/AP 132 to discover and enable channel access by a STA that is newly joining the BPAC BSS 130.

At 904 the C-PCP/AP 132 transmits at least one management/extension frame, including information for channel access by a STA. Generally, a management/extension frame may include information such as synchronization information, BSS identification, beamforming information, scheduling information, or any other type of information relevant to channel access operations. For example, a plurality of BF frames may be transmitted over different transmit sectors at 904. The transmission of management/extension frames may be performed by the C-PCP/AP 132, and other M-PCP/AP(s) 102 in the BPAC BSS 130 may also transmit management/extension frames in sequence following the transmission by the C-PCP/AP 132, or in parallel with the transmission by the C-PCP/AP 132.

At 906, the C-PCP/AP 132 receives, from a STA, at least one management/extension frame. For example, the STA may transmit a plurality of BF frames. The BF frame may include I-TX BFT feedback information, which may be used to identify the preferred transmit sector to be used by the C-PCP/AP 132 for communicating with the STA. Information contained in the management/extension frame from the STA may also be used by the C-PCP/AP 132 to identify the STA as being a legacy device. It should be noted that a legacy device might only recognize legacy management/extension frames, and might not respond to non-legacy (e.g., FDMG) management/extension frames. Thus, the C-PCP/AP 132 may transmit a legacy management/extension frame at 904, in order to receive a response from a legacy STA at 906. For example, the PCP/AP 102, 132 may occasionally (e.g., at regular intervals, which may be longer than a BI) transmit a legacy beacon frame to enable a legacy STA to be discovered and to access the BPAC BSS 130.

Optionally, at 908, the C-PCP/AP 132 exchanges information with one or more M-PCP/APs 102 within the BPAC BSS 130. This may take place during the PCP/AP coordination interval 720. Information exchanged between PCP/APs 102, 132 may include information from management/extension frames exchanged between the PCP/APs 102, 132 and the STA. The information exchanged between PCP/APs 102, 132 may be used to establish a communication link for serving the STA. For example, a preferred transmit sector may be identified using the exchanged information.

At 909, based on the information exchanged between the C-PCP/AP 132 and the STA (and optionally the information exchanged between the PCP/APs 102, 132), the C-PCP/AP 132 may determine that the STA should be provided with channel access by the C-PCP/AP 132 itself or by another M-PCP/AP 102 of the BPAC BSS 130. The C-PCP/AP 132 may determine that another M-PCP/AP 102 should serve the STA, for example, where the STA is outside of the coverage area of the C-PCP/AP 132 or where the STA is a legacy STA.

If the C-PCP/AP 132 determines the C-PCP/AP 132 should itself serve the STA, then at 910, the C-PCP/AP 132 transmits a further management/extension frame to the STA, to establish a communication link with the STA. For example, a feedback frame may be transmitted to the STA over the identified preferred transmit sector. The management/extension frame may include beacon information and/or scheduling information (e.g., scheduling an FDMG BI or a legacy BI). In some examples, beacon information and/or scheduling information may be transmitted in separate frames. In some examples, further request and response frames may be transmitted between the C-PCP/AP 132 and the STA.

If the C-PCP/AP 132 determines that another M-PCP/AP 102 should serve the STA, then at 912, the C-PCP/AP 132 assigns an M-PCP/AP 102 within the BPAC BSS 130 to serve the STA. For example, if the STA has been identified as a legacy device, the C-PCP/AP 132 may instruct an M-PCP/AP 102 to serve the STA in legacy mode. The assigned M-PCP/AP 102 then establishes a communication link with the STA using appropriate FDMG or legacy operations, as appropriate.

If there are multiple STAs, steps 906 to 912 may be performed in parallel for the multiple STAs, or may be performed iteratively for each one of the multiple STAs.

After completion of the method 900, the STA has channel access within the BPAC BSS 130, via the C-PCP/AP 132 or via the assigned M-PCP/AP 102.

Figure 10:
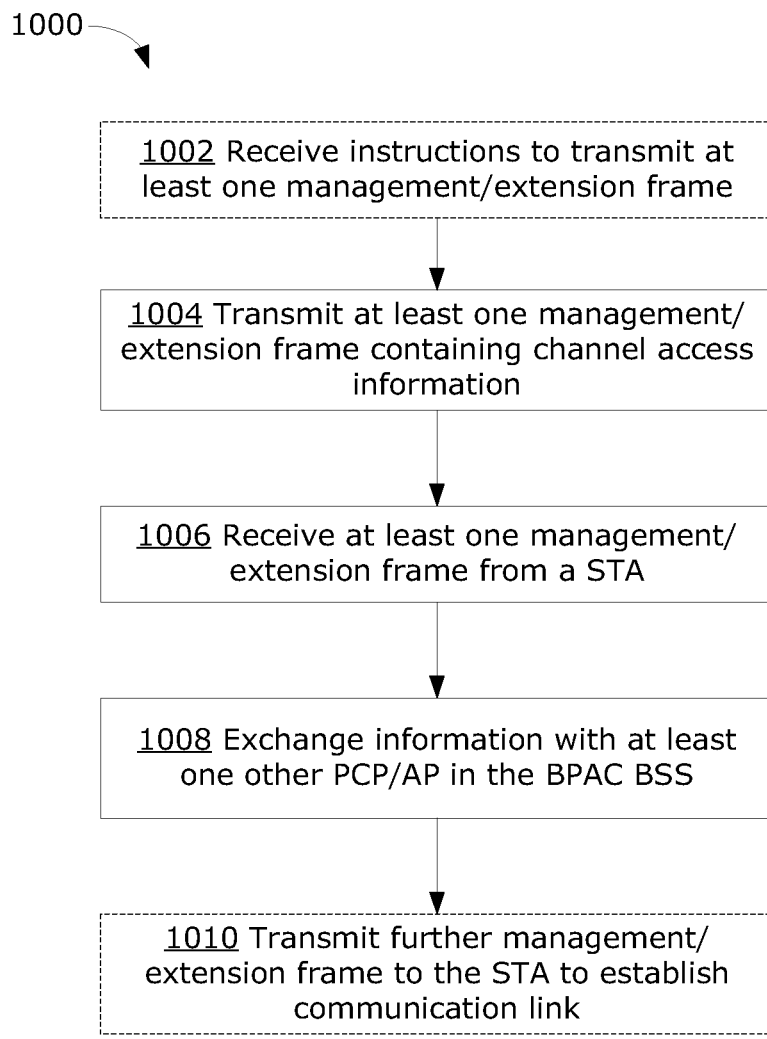
FIG. 10 is a flowchart illustrating another example method for enabling channel access by a STA in a BPAC BSS.

FIG. 10 is a flowchart illustrating another example method 1000 to enable channel access by a STA within the BPAC BSS 130. Similarly to the method 900, the method 1000 may be used to enable channel access by an FDMG STA 106 or by a legacy STA 16. The method 1000 may be performed by an M-PCP/AP 102 to discover a STA that is newly joining the BPAC BSS 130.

Optionally, at 1002, the M-PCP/AP 102 may receive instructions from the C-PCP/AP 132 of the BPAC BSS 130 to transmit at least one management/extension frame, in order to discover any STA that wishes to join the BPAC BSS 130. For example, the C-PCP/AP 132 may instruct the M-PCP/AP 102 to perform discovery in cases where the coverage of the C-PCP/AP 132 is not sufficient to cover the entire BPAC BSS 130 (e.g., the M-PCP/AP 102 located near the edge of the BPAC BSS 130 may be instructed to perform discovery for any STAs near the edge of the BPAC BSS 130). In some cases, the C-PCP/AP 132 may instruct the M-PCP/AP 102 to transmit a legacy management/extension frame, in order to discovery any legacy STA.

At 1004, the M-PCP/AP 102 transmits at least one management/extension frame, including information for channel access by a STA. The management/extension frame may be similar to that described above with respect to the method 900. The transmission of the management/extension frame by the M-PCP/AP 102 may be in sequence (with other M-PCP/APs 102 where applicable) following a transmission of management/extension frames by the C-PCP/AP 132, or in parallel (with other M-PCP/APs 102 where applicable) with the transmission by the C-PCP/AP 132.

At 1006, the M-PCP/AP 102 receives, from a STA 106, at least one management/extension frame. The management/extension frame received from the STA may be similar to that described above with respect to the method 900.

At 1008, the M-PCP/AP 102 exchanges information with at least the C-PCP/AP 132. Information exchanged between PCP/APs 102, 132 may be similar to that described above with respect to the method 900, and the exchange of information may take place during the PCP/AP coordination interval 720.

Optionally, at 1010, the M-PCP/AP 102 may transmit a further management/extension frame to the STA, to establish a communication link with the STA. This step may be performed in response to instructions from the C-PCP/AP 132 assigning the M-PCP/AP 102 to serve the STA. The communication link may be established using FDMG operations (e.g., as described above) or legacy operations, depending on whether the STA is to be served in FDMG mode or legacy mode.

Generally, discovery of a STA and providing service to a STA may be performed by the C-PCP/AP 132 itself, or the C-PCP/AP 132 may instruct another M-PCP/AP 102 within the BPAC BSS 130 to perform discovery and/or provide service. FIG. 9 illustrates an example method 900 in which the C-PCP/AP 132 performs discovery. FIG. 10 illustrates an example method 1000 in which the M-PCP/AP 102 performs discovery (in response to instructions from the C-PCP/AP 132). It should be understood that the example methods 900 and 1000 may take place within the same BPAC BSS 130, and may involve the same or different M-PCP/AP 102.

Although the examples described herein refer to STAs, it should be understood that a STA may be any electronic device (ED), for example any ED capable of wireless communications and/or beamforming operations, including any suitable mobile or stationary devices such as smartphones, laptops, mobile phones or tablet devices, for example.

A PCP/AP may also be referred to as simply a PCP, or as simply as an AP. An AP, for example, may be a base station, and may be implemented as a router, or other transmission point (TP).

In various examples described herein, methods and systems are provided to enable a future generation 60 GHz system, using BPAC BSSs to be backwards compatible and coexist with legacy devices. Channel access can be scheduled to coordinate beamforming and spatial sharing operations between FDMG devices and legacy devices within the same BPAC BSS.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method, comprising:
    transmitting, by a coordination personal basic service set control point/access point (PCP/AP) in a single basic service set (BSS) having two or more serving personal BSS control PCPs/APs, at least a first management/extension frame, the management/extension frame including information for channel access by a station (STA) within the BSS;
    receiving, from the STA, at least a second management/extension frame; and
    based on information exchanged between the coordination PCP/AP (C-PCP/AP) and the STA via at least the first and second management/extension frames, providing the STA with channel access within the BSS by:
        establishing a communication link for the C-PCP/AP to serve the STA; or
        assigning, by the C-PCP/AP, a second PCP/AP in the BSS to serve the STA.

2. The method of claim 1 wherein transmission of at least the first management/extension frame by the C-PCP/AP is performed in parallel with transmission of at least a third management/extension frame by at least the second PCP/AP.

3. The method of claim 1 wherein transmission of at least the first management/extension frame by the C-PCP/AP is performed in sequence with transmission of at least a third management/extension frame by at least the second PCP/AP.

4. The method of claim 1 wherein at least one management/extension frame exchanged between the STA and the C-PCP/AP or the second PCP/AP includes at least one of: synchronization information, BSS identification, STA identification, beamforming information or scheduling information.

5. The method of claim 4 wherein the scheduling information defines a beacon interval (BI) schedule, including a beacon header interval (BHI) and a data transfer interval (DTI).

6. The method of claim 5 wherein a first BI schedule, including a first BHI and a first DTI, is implemented by the C-PCP/AP and the C-PCP/AP transmits scheduling information defining a second BI schedule, including a second BHI and a second DTI, to be implemented by the second PCP/AP when serving the STA;
    the first BI schedule including a first reserved service period (SP) reserved for transmission of legacy management/extension frames;
    the second BI schedule including a second reserved SP reserved for transmission of non-legacy management/extension frames.

7. The method of claim 6, wherein, in the first BI schedule, the first reserved SP is scheduled during the first DTI and data transfer to and from the C-PCP/AP is permitted in at least one first data transfer portion of the DTI outside of the first reserved SP; and wherein, in the second BI schedule, the second reserved SP is scheduled during the second DTI and data transfer to and from the second PCP/AP is permitted in at least one second data transfer portion of the DTI outside of the second reserved SP.

8. The method of claim 1 wherein the C-PCP/AP, based on information exchanged via at least the first and second management/extension frames, identifies the STA as a legacy STA, and wherein the C-PCP/AP assigns the second PCP/AP to serve the STA in a legacy mode of operation.

9. The method of claim 1, further comprising:
    exchanging, with the second PCP/AP, information based on management/extension frames exchanged between the STA and the C-PCP/AP;
    wherein the information exchanged with the second PCP/AP includes information for the C-PCP/AP or the second PCP/AP to establish a communication link to serve the STA.

10. A coordination personal basic service set control point/access point (PCP/AP) comprising:
    a network interface configured for wireless communication with a station (STA) and at least a second PCP/AP within a single basic service set (BSS) having two or more serving PCPs/APs; and
    a processor coupled to the network interface and configured to execute instructions to cause the coordination PCP/AP (C-PCP/AP) to:
        transmit at least a first management/extension frame, the management/extension frame including information for channel access by the STA within the BSS;
        receive, from the STA, at least a second management/extension frame; and
        based on information exchanged between with the STA via at least the first and second management/extension frames, provide the STA with channel access within the BSS by:
            establishing a communication link to serve the STA; or
            assigning the second PCP/AP to serve the STA.

11. The C-PCP/AP of claim 10 wherein transmission of at least the first management/extension frame is performed in parallel with transmission of at least a third management/extension frame by at least the second PCP/AP.

12. The C-PCP/AP of claim 10 wherein transmission of at least the first management/extension frame is performed in sequence with transmission of at least a third management/extension frame by at least the second PCP/AP.

13. The C-PCP/AP of claim 10 wherein at least one management/extension frame exchanged with the STA includes at least one of: synchronization information, BSS identification, STA identification, beamforming information or scheduling information.

14. The C-PCP/AP of claim 13 wherein the scheduling information defines a beacon interval (BI) schedule, including a beacon header interval (BHI) and a data transfer interval (DTI).

15. The C-PCP/AP of claim 14 wherein the processor is further configured to execute instructions to cause the C-PCP/AP to:
    implement a first BI schedule, including a first BHI and a first DTI; and
    transmit scheduling information defining a second BI schedule, including a second BHI and a second DTI, to be implemented by the second PCP/AP when serving the STA;
    the first BI schedule including a first reserved service period (SP) reserved for transmission of legacy management/extension frames;
    the second BI schedule including a second reserved SP reserved for transmission of non-legacy management/extension frames.

16. The C-PCP/AP of claim 15, wherein, in the first BI schedule, the first reserved SP is scheduled during the first DTI and data transfer to and from the C-PCP/AP is permitted in at least one first data transfer portion of the DTI outside of the first reserved SP; and wherein, in the second BI schedule, the second reserved SP is scheduled during the second DTI and data transfer to and from the second PCP/AP is permitted in at least one second data transfer portion of the DTI outside of the second reserved SP.

17. The C-PCP/AP of claim 10 wherein the processor is further configured to execute instructions to cause the C-PCP/AP to:
- based on information exchanged via at least the first and second management/extension frames, identify the STA as a legacy STA; and
- assign the second PCP/AP to serve the STA in a legacy mode of operation.

18. The C-PCP/AP of claim 10, wherein the processor is further configured to execute instructions to cause the C-PCP/AP to:
- exchange, with the second PCP/AP, information based on management/extension frames exchanged with the STA;
- wherein the information exchanged with the second PCP/AP includes information for establishing a communication link to serve the STA.

19. A method, comprising:
- in a single basic service set (BSS) having at least a coordination personal basic service set control point/access point (PCP/AP) and a second PCP/AP, transmitting, by the second PCP/AP, at least a first management/extension frame, the management/extension frame including information for channel access by a station (STA) within the BSS;
- receiving, from the STA, at least a second management/extension frame; and
- exchanging information with the coordination PCP/AP (C-PCP/AP), the exchanged information at least partially being based on information contained in the second management/extension frame from the STA.

20. The method of claim 19, further comprising:
- in response to instructions received from the C-PCP/AP, establishing a communication link for the second PCP/AP to serve to STA.

21. The method of claim 20 wherein, in response to instructions received from the C-PCP/AP, the second PCP/AP serves the STA in a legacy mode of operation.

22. The method of claim 19 wherein the second PCP/AP transmits at least the first management/extension frame in response to instructions received from the C-PCP/AP.

23. A personal basic service set control point/access point (PCP/AP) comprising:
- a network interface configured for wireless communication with a station (STA) and at least a coordination PCP/AP (C-PCP/AP) within a single basic service set (BSS) having two or more serving PCPs/APs; and
- a processor coupled to the network interface and configured to execute instructions to cause the PCP/AP to:
  - transmit at least a first management/extension frame, the management/extension frame including information for channel access by the STA within the BSS;
  - receive, from the STA, at least a second management/extension frame; and
  - exchange information with the C-PCP/AP, the exchanged information at least partially being based on information contained in the second management/extension frame from the STA.

* * * * *